US010841481B2

(12) United States Patent
Nagao et al.

(10) Patent No.: US 10,841,481 B2
(45) Date of Patent: Nov. 17, 2020

(54) CONTROL APPARATUS, METHOD OF CONTROLLING THE SAME AND PROGRAM

(71) Applicant: CANON KABUSHIKI KAISHA, Tokyo (JP)

(72) Inventors: Yoshitaka Nagao, Tokyo (JP); Toru Nakanishi, Kamakura (JP); Takumi Kimura, Tokyo (JP); Motoo Ohnishi, Kawasaki (JP); Takahiro Iwasaki, Port Washington, NY (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/513,192

(22) PCT Filed: Sep. 14, 2015

(86) PCT No.: PCT/JP2015/004671
§ 371 (c)(1),
(2) Date: Mar. 22, 2017

(87) PCT Pub. No.: WO2016/056177
PCT Pub. Date: Apr. 14, 2016

(65) Prior Publication Data
US 2017/0310882 A1    Oct. 26, 2017

(30) Foreign Application Priority Data

Oct. 10, 2014 (JP) ................ 2014-209397
Nov. 19, 2014 (JP) ................ 2014-234911

(51) Int. Cl.
*H04N 5/232* (2006.01)
*G06F 3/0484* (2013.01)
(Continued)

(52) U.S. Cl.
CPC ..... *H04N 5/23216* (2013.01); *G06F 3/04845* (2013.01); *G06F 3/04883* (2013.01);
(Continued)

(58) Field of Classification Search
CPC .......... H04N 5/23216; H04N 5/23296; H04N 5/23293; H04N 5/23238; G08B 13/19689; G06F 3/0488; G06F 2203/04808
(Continued)

(56) References Cited

U.S. PATENT DOCUMENTS 7,663,666 B2   2/2010  Kawai et al.
9,883,094 B2   1/2018  Zhu et al.
(Continued)

FOREIGN PATENT DOCUMENTS

CN    102231799 A    11/2011
CN    103729128 A    4/2014
(Continued)

OTHER PUBLICATIONS

Nov. 17, 2015 International Search Report and Written Opinion in International Patent Appln. No. PCT/JP2015/004671.
(Continued)

*Primary Examiner* — Albert H Cutler
(74) *Attorney, Agent, or Firm* — Venable LLP

(57) ABSTRACT

The present invention enables one to easily set an image capturing condition, and to easily grasp a state of a captured image. For doing so, an instruction of either a zooming-in control or a zooming-out control of the image capturing apparatus, is determined based on a position relation of a first coordinate and a second coordinate instructed with respect to an image from the image capturing apparatus displayed on a display unit. The image capturing apparatus is controlled based on the result of that determination, the first coordinates and the second coordinates.

16 Claims, 18 Drawing Sheets

(51) Int. Cl.
*G06F 3/0488* (2013.01)
*G08B 13/196* (2006.01)
*G03B 17/18* (2006.01)
*H04N 5/225* (2006.01)

(52) U.S. Cl.
CPC ... *G08B 13/19689* (2013.01); *H04N 5/23206* (2013.01); *H04N 5/23293* (2013.01); *H04N 5/23296* (2013.01); *G03B 17/18* (2013.01); *G06F 3/0488* (2013.01); *G06F 2203/04806* (2013.01); *G06F 2203/04808* (2013.01); *H04N 5/23238* (2013.01)

(58) Field of Classification Search
USPC ............. 348/333.01–333.03, 333.11, 333.12, 348/240.99–240.3
See application file for complete search history.

(56) References Cited

U.S. PATENT DOCUMENTS

| | | | | |
|---|---|---|---|---|
| 2009/0303204 | A1* | 12/2009 | Nasiri | A63F 13/06 345/184 |
| 2010/0289825 | A1* | 11/2010 | Shin | G06F 3/04883 345/667 |
| 2011/0013049 | A1* | 1/2011 | Thorn | G06F 3/0488 348/240.3 |
| 2011/0199498 | A1* | 8/2011 | Matsuzawa | H04N 5/232 348/220.1 |
| 2013/0083222 | A1* | 4/2013 | Matsuzawa | H04N 5/23296 348/240.3 |
| 2014/0047380 | A1* | 2/2014 | Mak | G06F 3/041 715/800 |
| 2015/0020024 | A1* | 1/2015 | Lee | G06F 3/03545 715/800 |
| 2015/0215524 | A1 | 7/2015 | Zhu et al. | |
| 2016/0255268 | A1* | 9/2016 | Kang | G06F 3/04842 348/333.11 |
| 2018/0109721 | A1 | 4/2018 | Zhu et al. | |

FOREIGN PATENT DOCUMENTS

| | | | |
|---|---|---|---|
| JP | 2001-145094 | A | 5/2001 |
| JP | 2004-032524 | A | 1/2004 |
| JP | 2004-157869 | A | 6/2004 |
| JP | 2005-130390 | A | 5/2005 |
| JP | 2005130390 | * | 5/2005 |
| WO | 2014/056440 | A1 | 4/2014 |

OTHER PUBLICATIONS

Apr. 16, 2018 European Search Report in European Patent Appln. No. 15848785.0.
Mar. 1, 2019 Chinese Official Action in Chinese Patent Appln. No. 201580054132.5.

* cited by examiner

[Fig. 1]
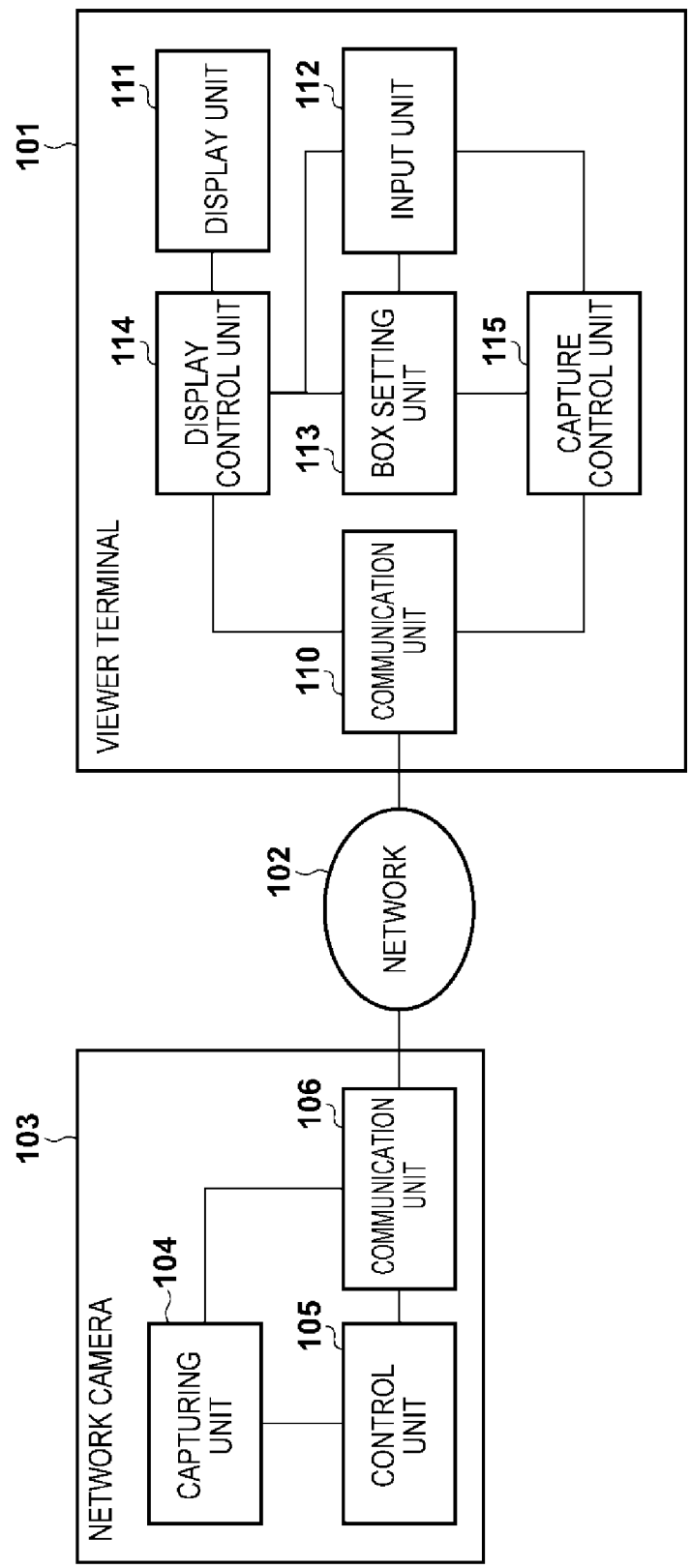

[Fig. 2]
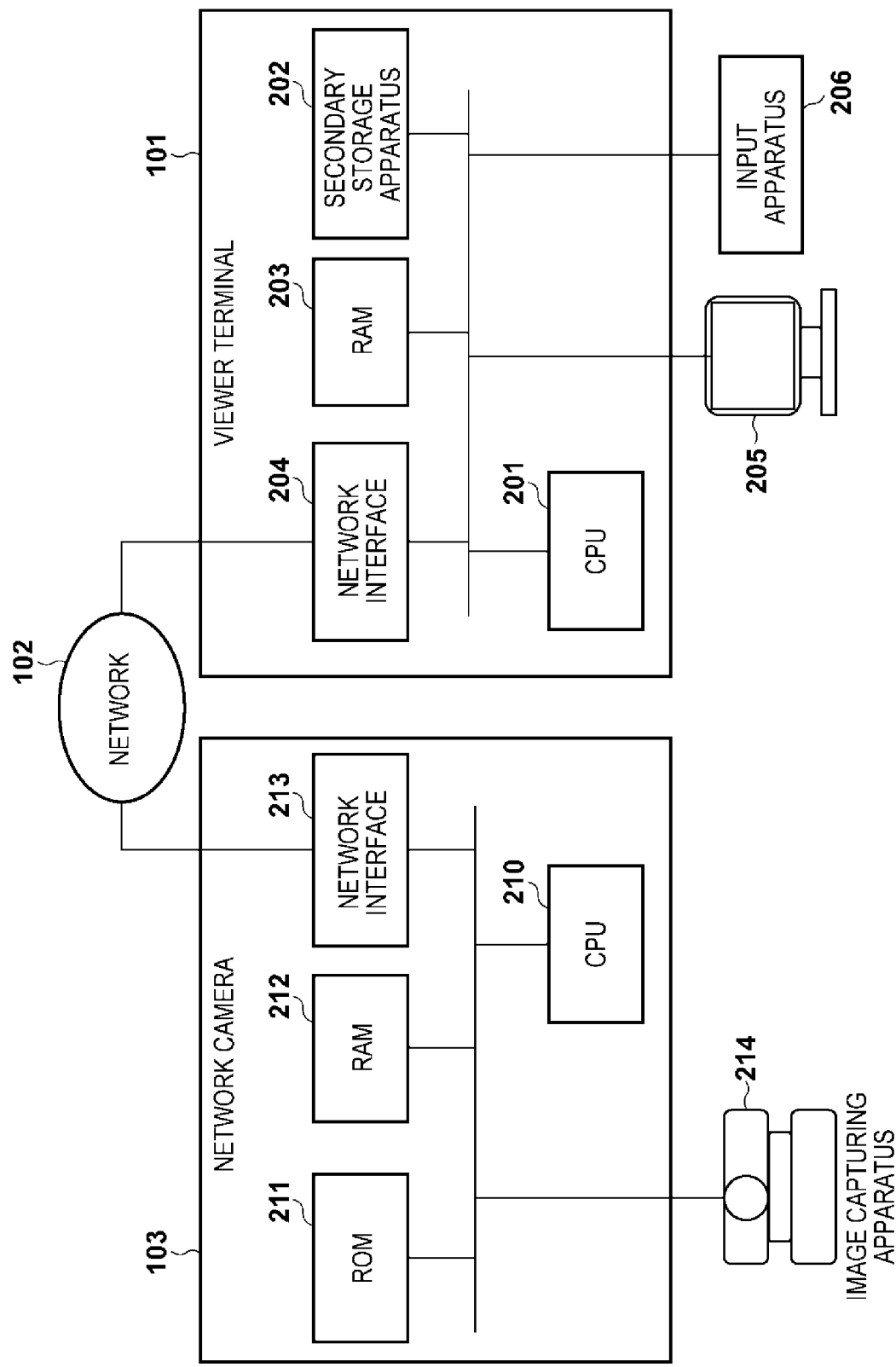

[Fig. 3A]
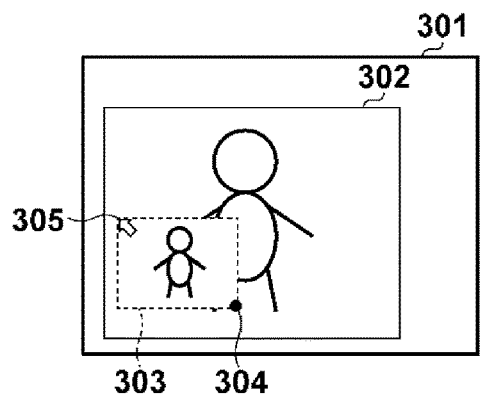
[Fig. 3B]
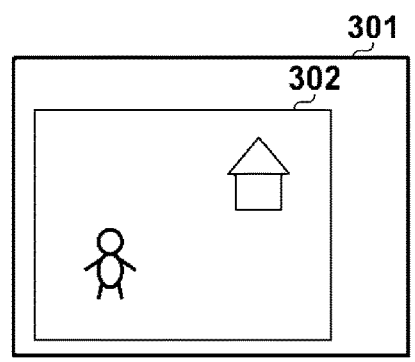
[Fig. 3C]
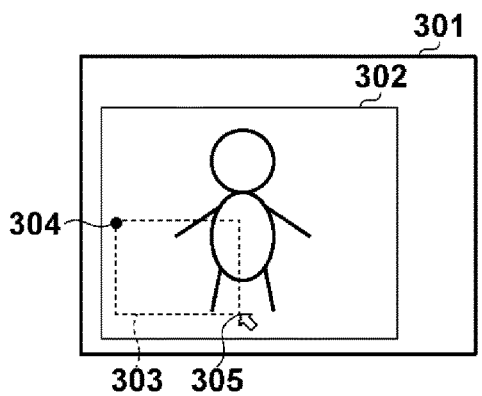
[Fig. 3D]
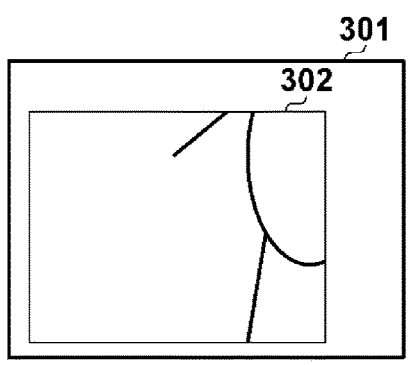

[Fig. 4]
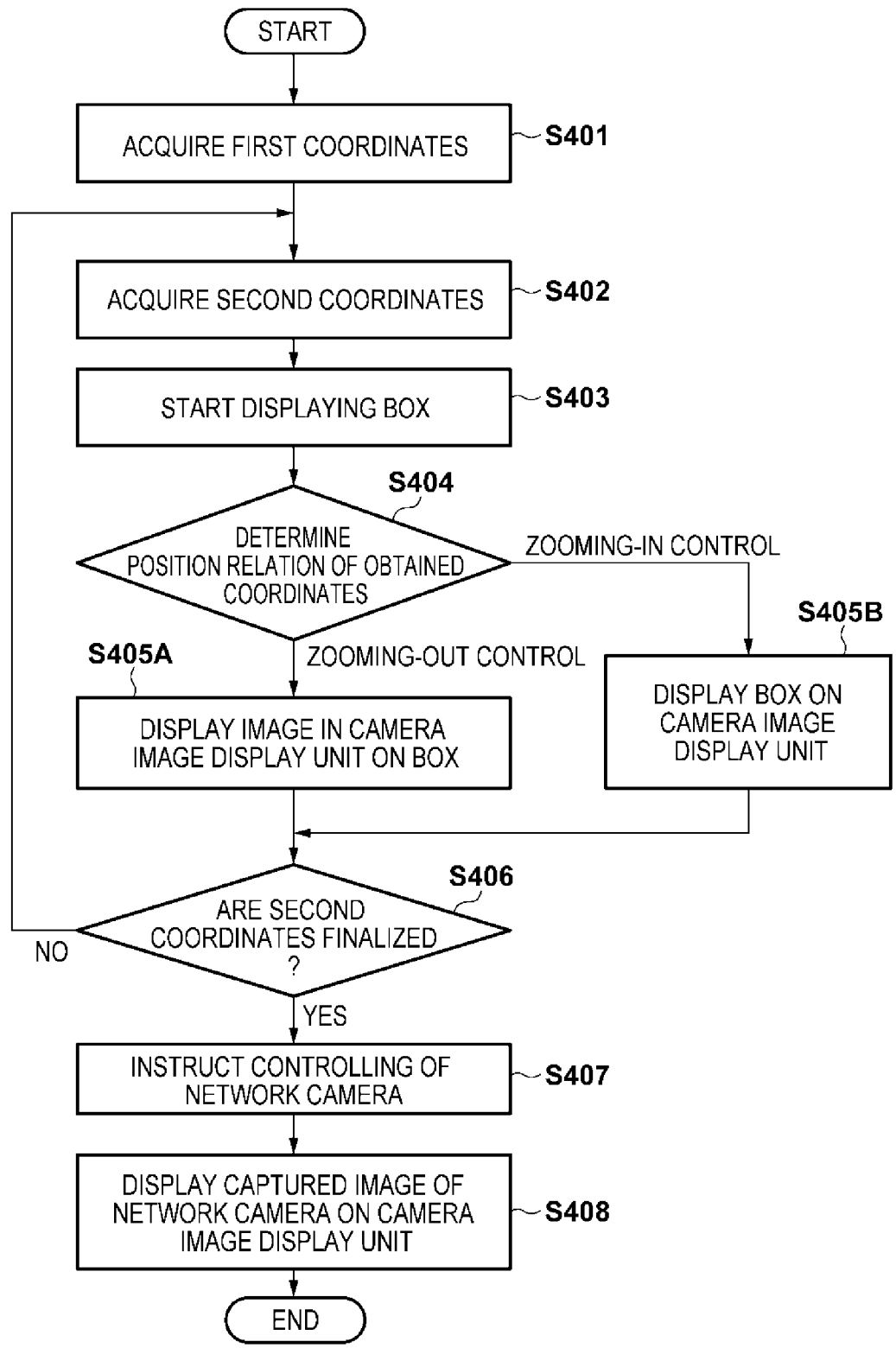

[Fig. 5A]
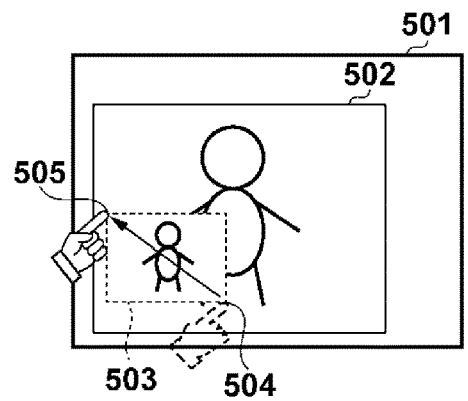
[Fig. 5B]
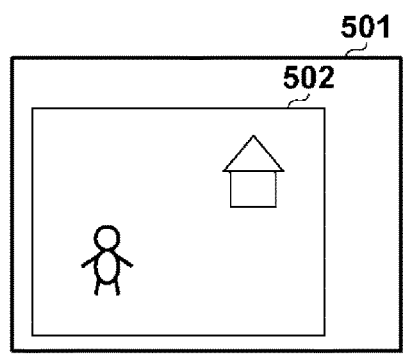
[Fig. 5C]
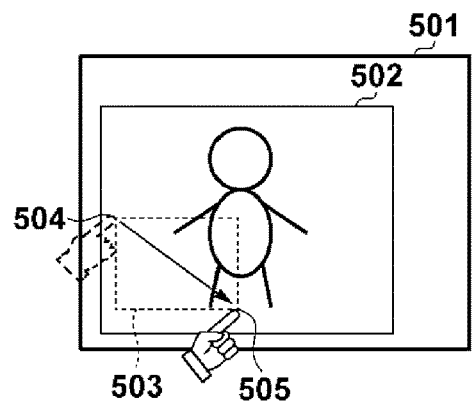
[Fig. 5D]
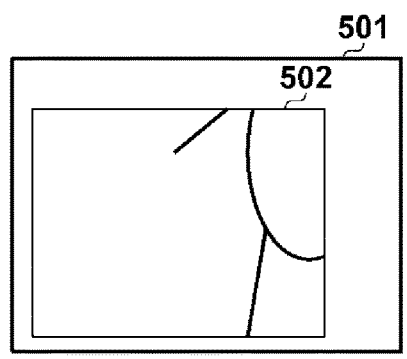

[Fig. 6]
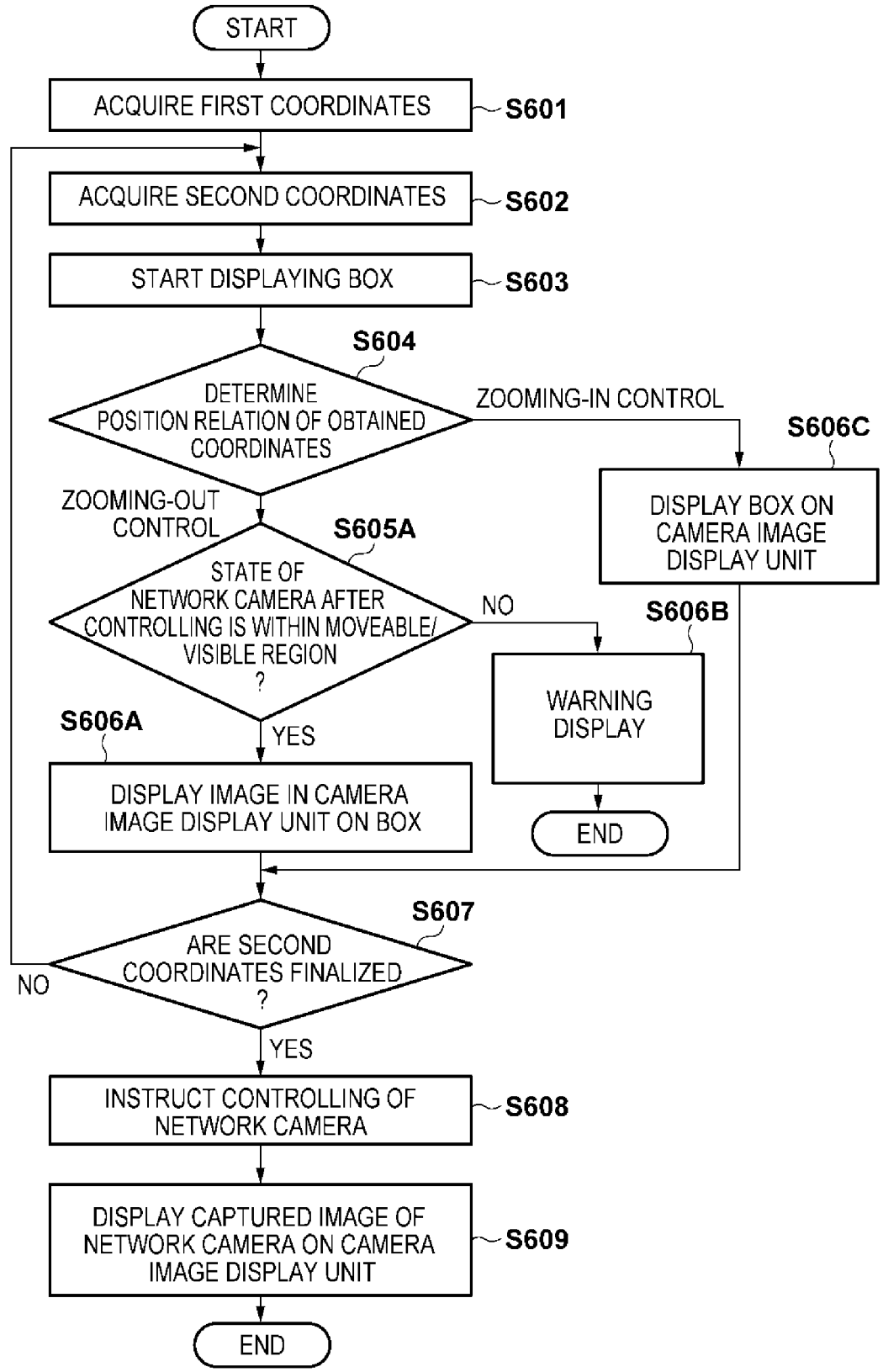

[Fig. 7A]
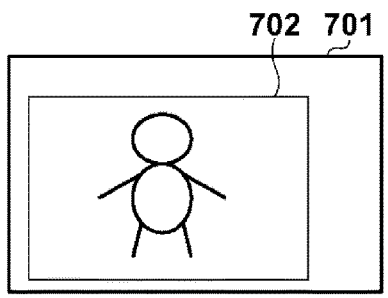
[Fig. 7B]
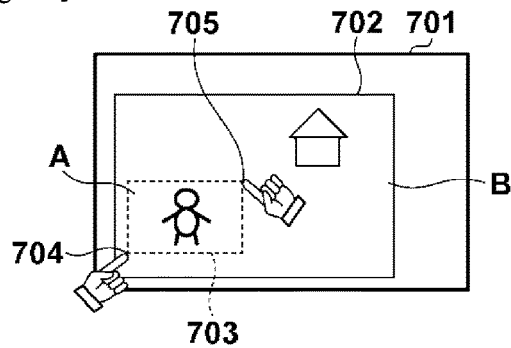
[Fig. 7C]
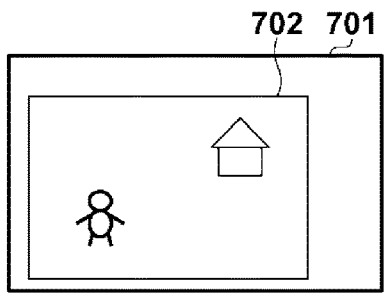
[Fig. 7D]
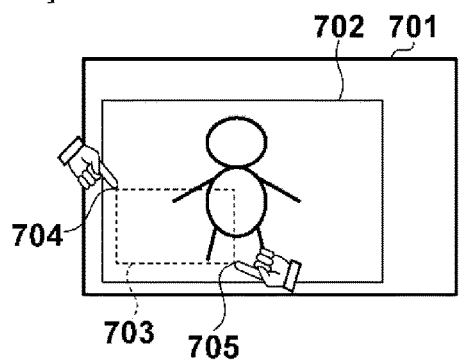
[Fig. 7E]
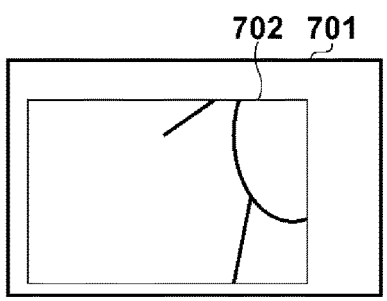

[Fig. 8]
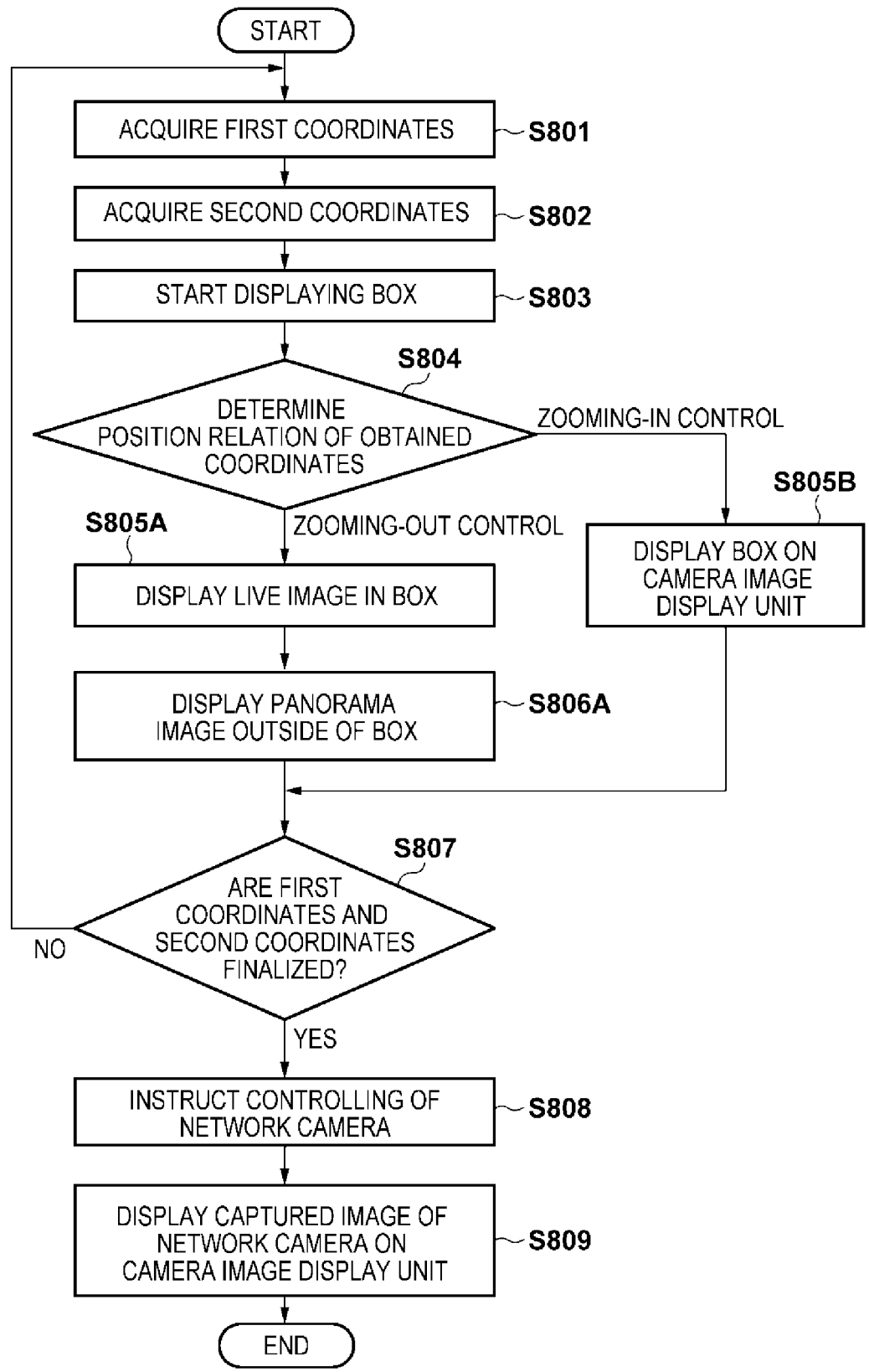

[Fig. 9A]
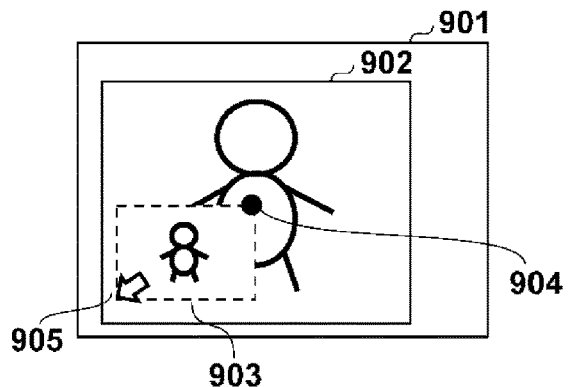
[Fig. 9B]
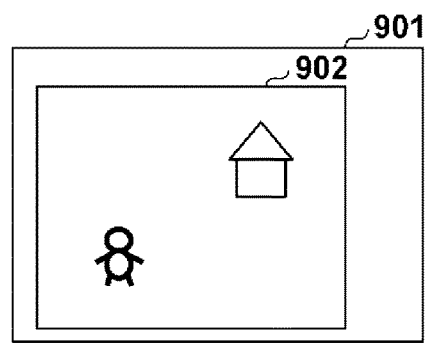
[Fig. 9C]
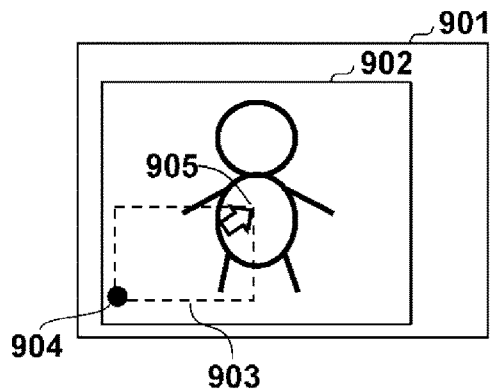
[Fig. 9D]
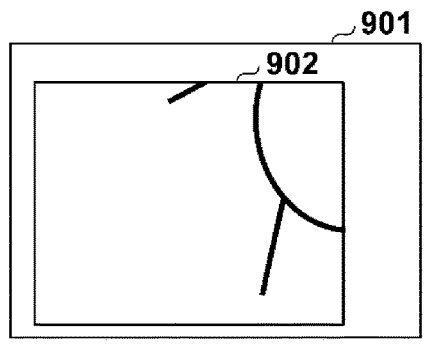

[Fig. 10]
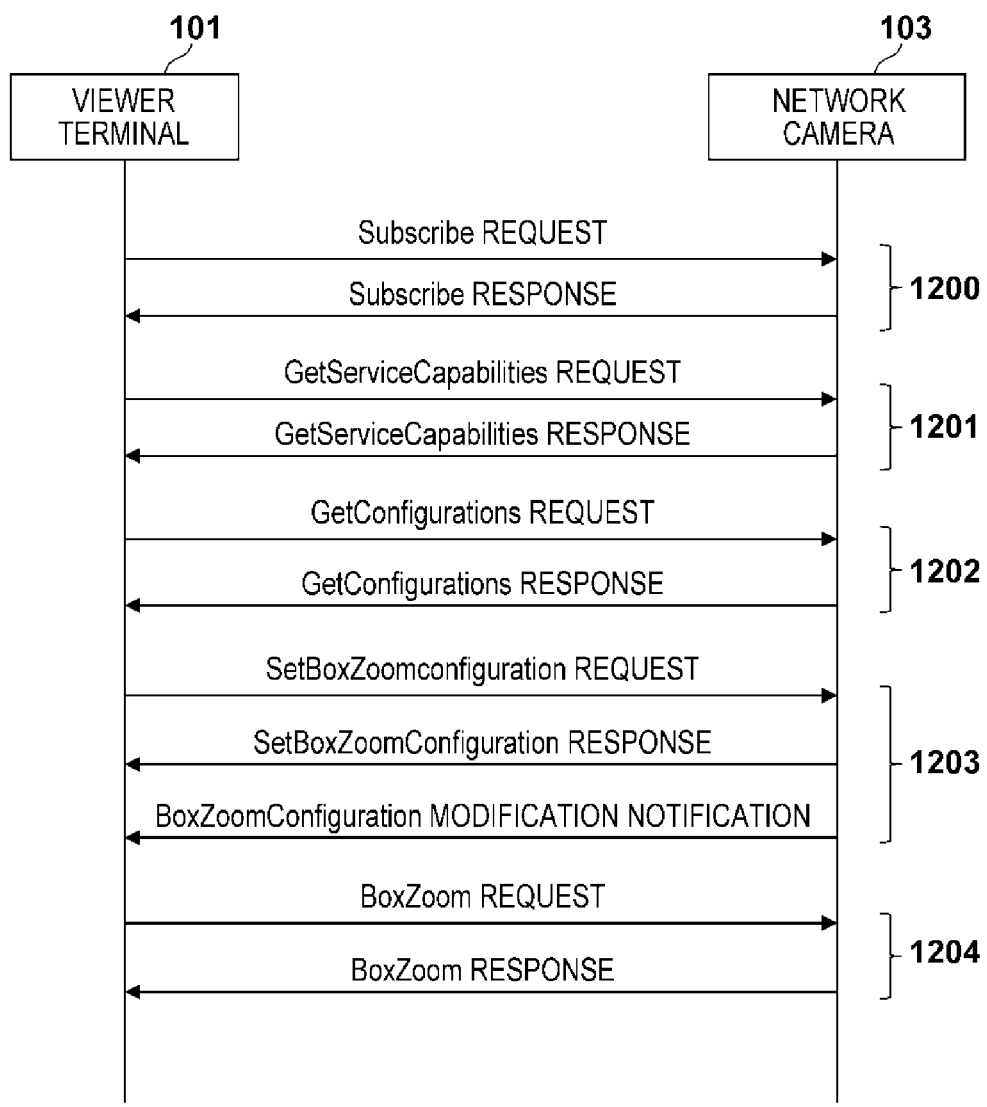

[Fig. 11]
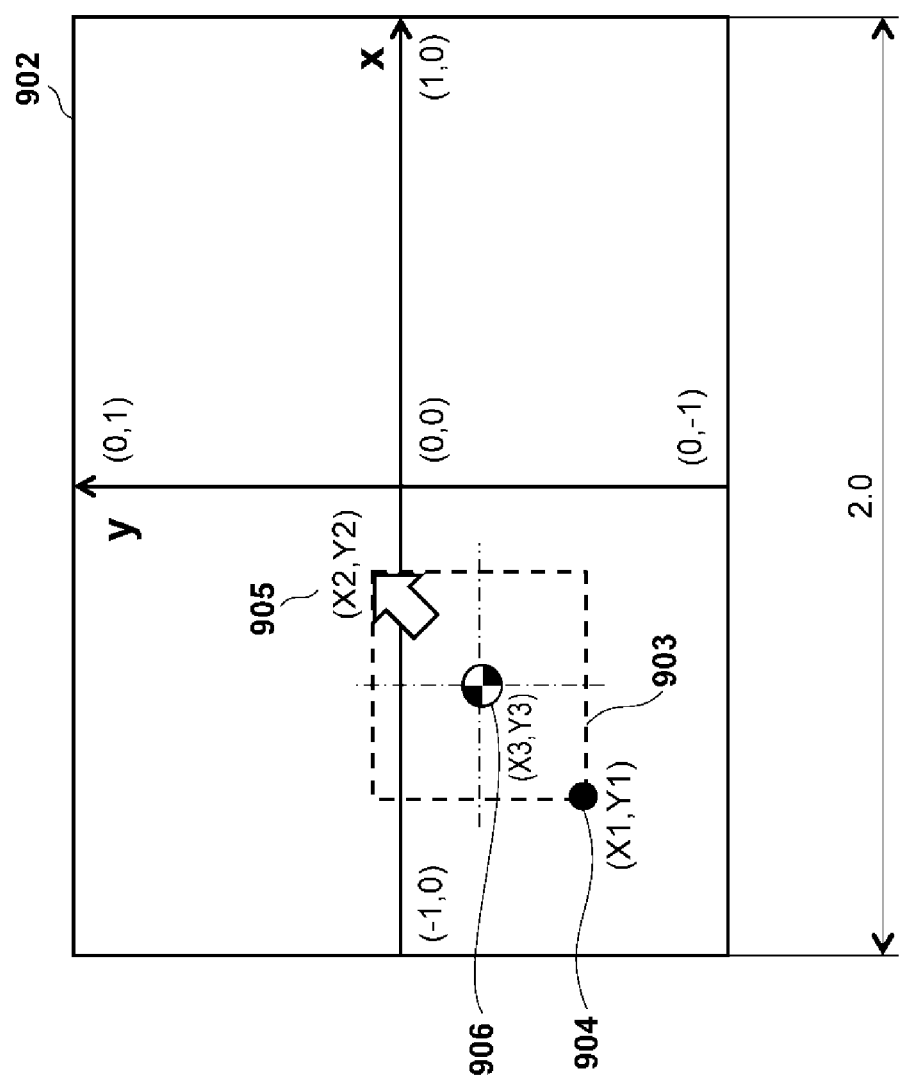

[Fig. 12]
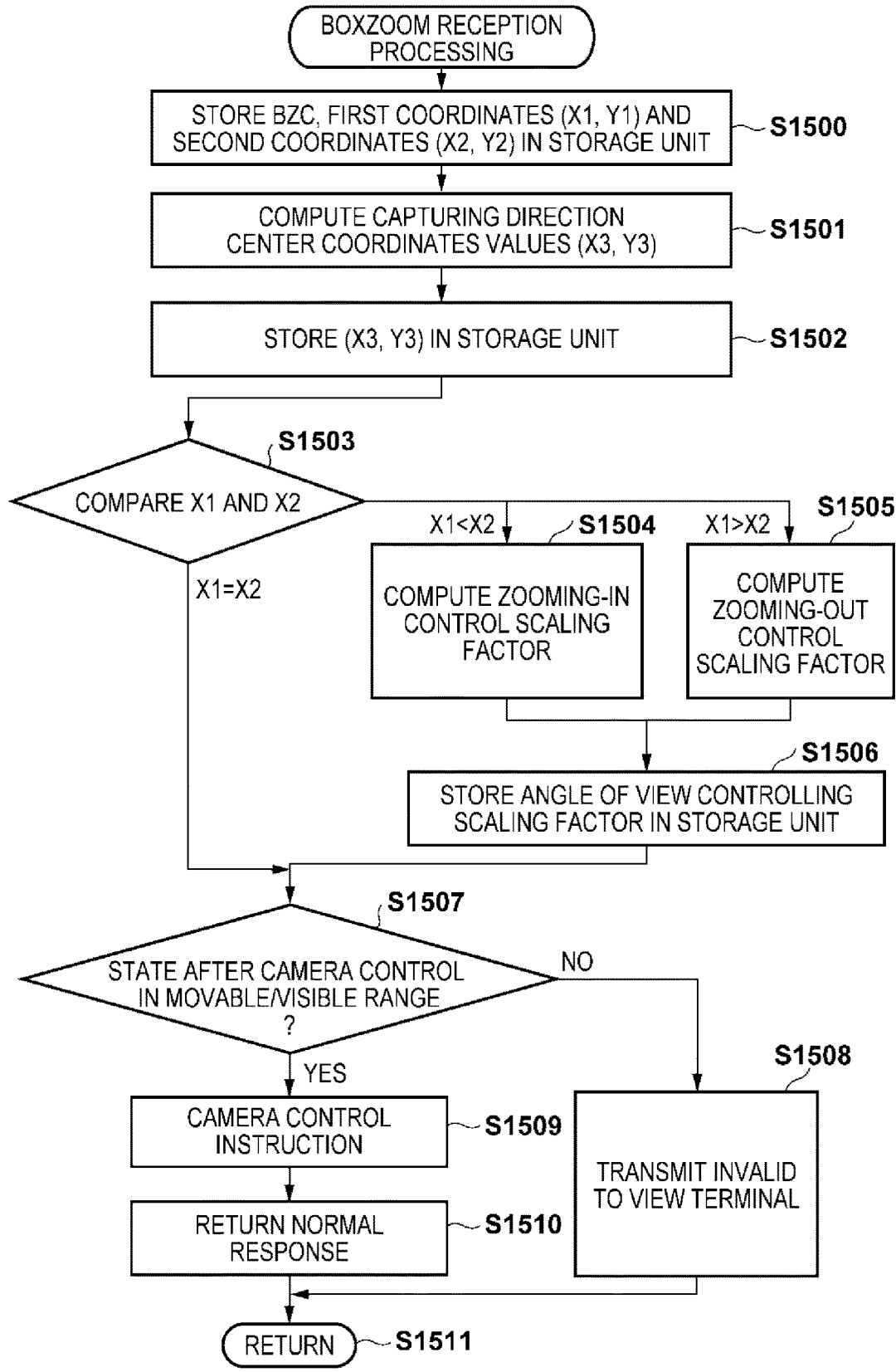

[Fig. 13]
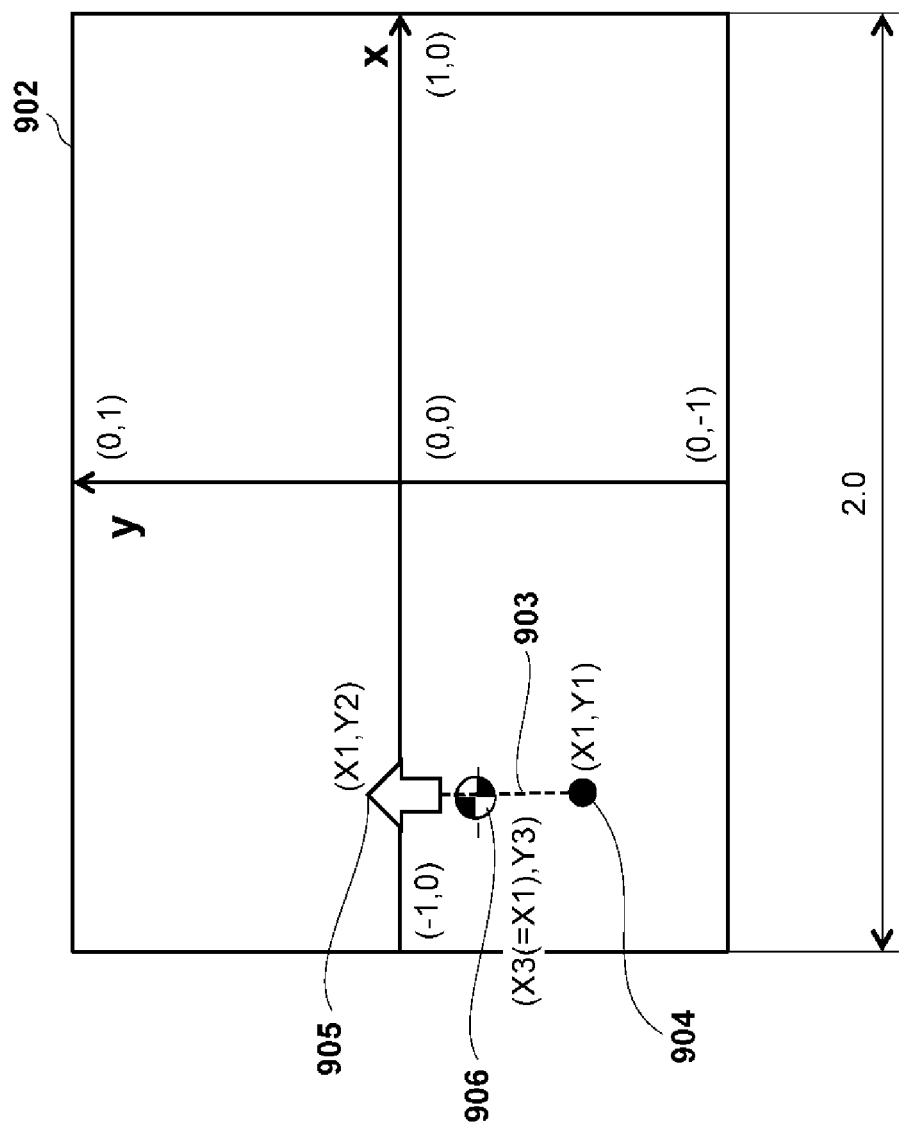

[Fig. 14]
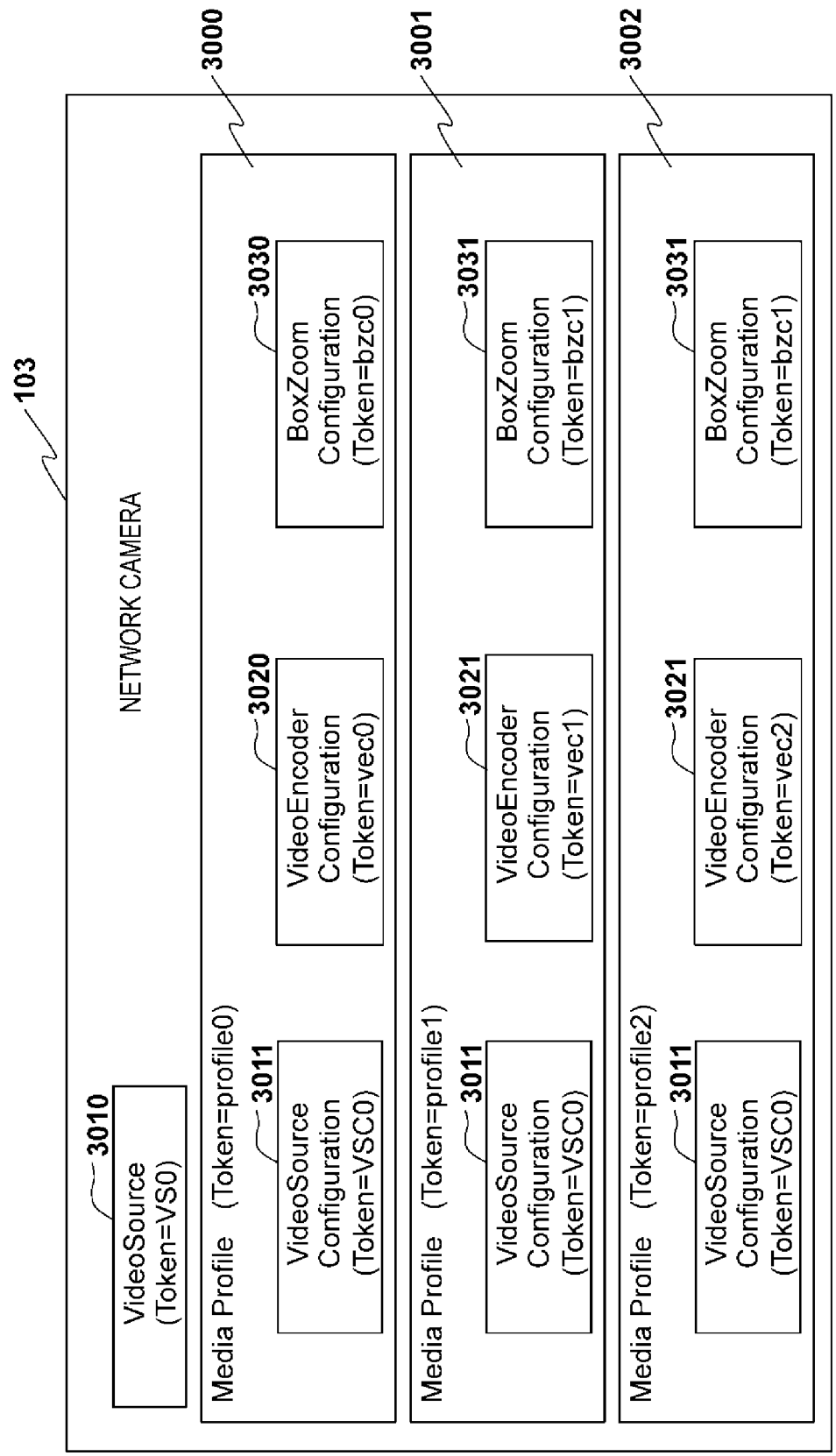

[Fig. 15A]
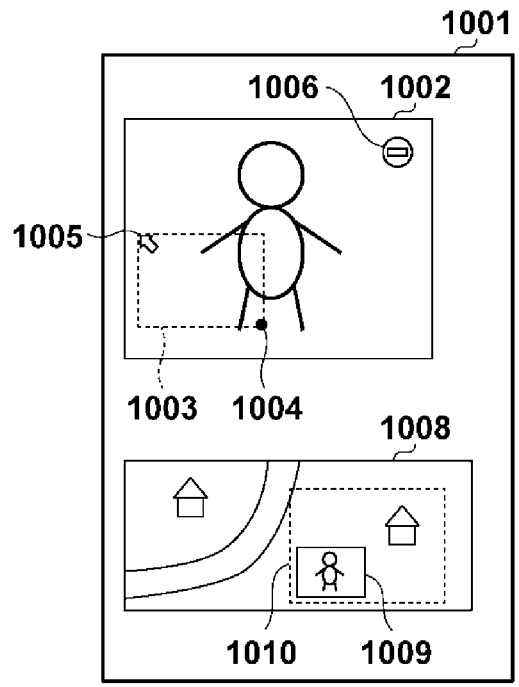
[Fig. 15B]
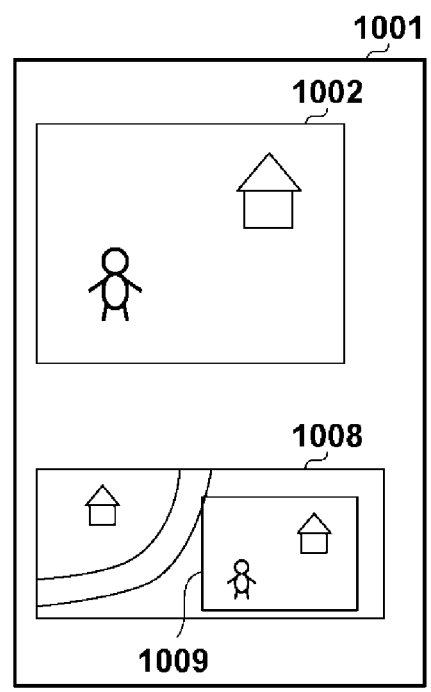

[Fig. 15C]
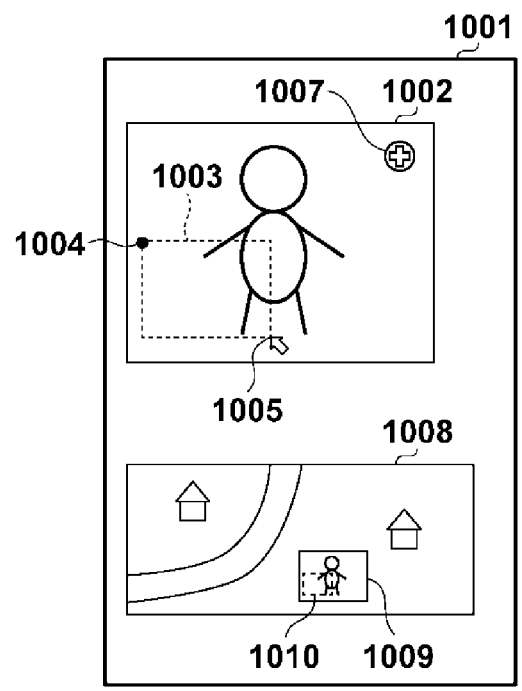
[Fig. 15D]
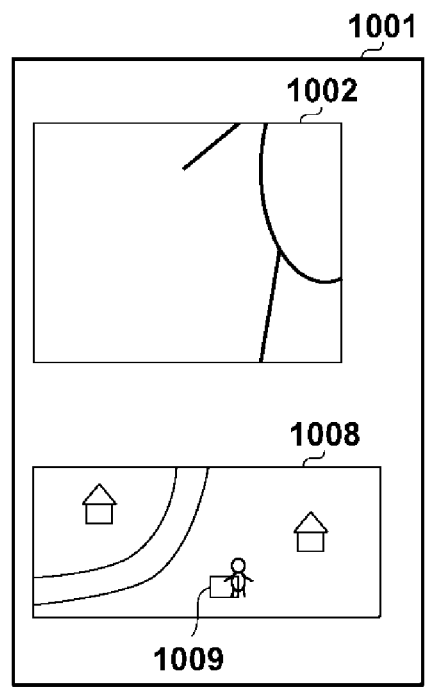

[Fig. 16]
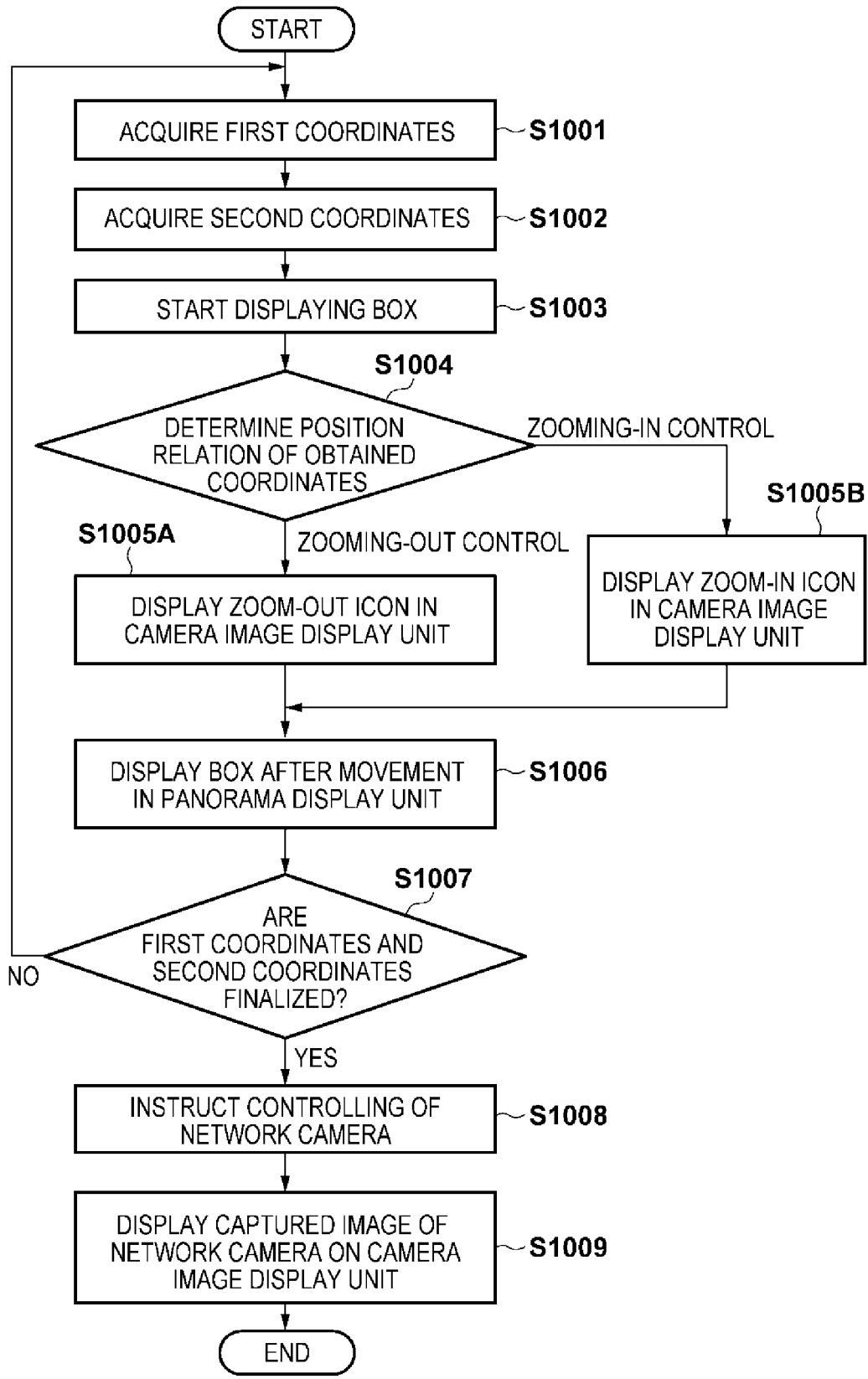

[Fig. 17]
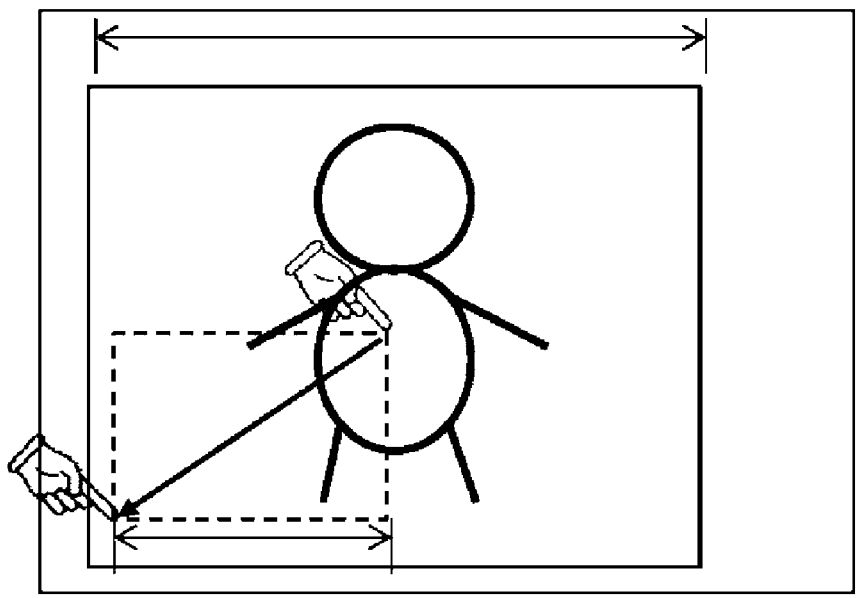

CONTROL APPARATUS, METHOD OF CONTROLLING THE SAME AND PROGRAM

TECHNICAL FIELD

The present invention relates to a control apparatus for controlling capturing in an image capturing apparatus, a method of controlling the same, and a program.

BACKGROUND ART

Conventionally, in a case where capturing of a capturing target in an image capturing apparatus such as a monitoring camera is performed by making an instruction by a remote operation, it is possible to instruct image capturing conditions such as an orientation in which the image capturing apparatus captures, a zooming-in/zooming-out, or the like, by an instruction unit such as a joystick. However, simultaneously performing instruction operations for an angle of view and a capturing direction of the monitoring camera by a joystick while watching a monitor displaying the captured image is work that requires skill.

Also, performing instructions such as for zooming an image in a digital camera, a mobile terminal, or the like, when an image is displayed on a monitor comprised therein has been proposed. As documents disclosing such technique, Japanese Patent Laid-Open No. 2004-157869 (hereinafter referred to as document 1), and Japanese Patent Laid-Open No. 2004-32524 (hereinafter referred to as document 2) are given.

Also, in an image capturing apparatus that transmits an image captured by the image capturing apparatus to a receiving apparatus such as a mobile terminal which is a client apparatus, a command group is implemented to support a query of capabilities that the image capturing apparatus has, a setting change, an angle of view change, a start of distribution of an image, or the like, from an external device such as a mobile terminal. In recent years, as an example of such a command group, something that is defined by a specification established by ONVIF (Open Network Video Interface Forum) is known.

In document 1, displaying an instructed zoom range on a screen, and performing a magnified display of the zoom range for a whole screen has been proposed. Also, in document 2, a user interface in which in a case where an angle of view is set in advance, and a captured image is changed by a zoomed-out side, a box representing an angle of view that is set is displayed, and a photographic subject within the angle of view can be confirmed while watching a state of the surroundings has been proposed.

However, it is not disclosed that a portion of interest in the captured image is instructed, and the angle of view of the camera is controlled in accordance with the manner of the instruction. Also, when zooming control of a camera to a zoomed-out side is performed, a position relation between the image of the current angle of view and the angle of view of the zoomed-out side cannot be designated easily. Also, the operator simply performs control to the zoomed-out side by an instruction on an image, and as a result, it is difficult for the operator to grasp what the image will be like in advance.

SUMMARY OF INVENTION

The present invention was conceived to solve the above described problems. The present invention provides a control apparatus for which it is easy to set an image capturing condition, and by which it is possible to grasp a state of a captured image easily, a method of controlling the same and a program.

According to a first aspect of the present invention, there is provided a control apparatus that controls capturing of an image capturing apparatus, the control apparatus comprising: determination means for determining an instruction of either a zooming-in control or a zooming-out control of the image capturing apparatus, based on a position relation of a first coordinate and a second coordinate instructed with respect to an image from the image capturing apparatus displayed on a display unit; and control means for controlling the image capturing apparatus based on a result of the determination by the determination means, the first coordinate and the second coordinate.

According to a second aspect of the present invention, there is provided a control apparatus that controls capturing of an image capturing apparatus, the control apparatus comprising: determination means for determining an instruction of either a zooming-in control or a zooming-out control of the image capturing apparatus, based on a position relation of a first coordinate and a second coordinate instructed with respect to an image from the image capturing apparatus displayed on a display unit; and control means for performing the zooming-out control of the image capturing apparatus by a pre-determined zoom amount in a case where a result of the determination by the determination means is an instruction of the zooming-out control.

According to a third aspect of the present invention, there is provided a method of controlling a control apparatus that controls capturing of an image capturing apparatus, the method comprising: determining an instruction of either a zooming-in control or a zooming-out control of the image capturing apparatus, based on a position relation of a first coordinate and a second coordinate instructed with respect to an image from the image capturing apparatus instructed on a display unit; and controlling the image capturing apparatus based on a result of the determination, the first coordinate and the second coordinate in a case where it is determined that the result of the determination indicates an instruction of the zooming-out control.

According to a fourth aspect of the present invention, there is provided a control apparatus that controls capturing of an image capturing apparatus, the control apparatus comprising: reception means for receiving a first coordinate and a second coordinate designated in relation to an image from the image capturing apparatus displayed on a display unit; and control means for controlling the image capturing apparatus so that a region defined by the first coordinate and the second coordinate designated in relation to the image from the image capturing apparatus displayed on the display unit corresponds to a current angle of view of the image capturing apparatus.

By virtue of the present invention it is possible to easily set an image capturing condition, and to easily grasp a state of a captured image.

Further features of the present invention will become apparent from the following description of exemplary embodiments (with reference to the attached drawings).

BRIEF DESCRIPTION OF DRAWINGS

FIG. 1 is a functional configuration diagram of a camera control system.

FIG. 2 is a hardware configuration diagram of the camera control system.

FIG. 3A is a view for illustrating a user interface.

FIG. 3B is a view for illustrating a user interface.
FIG. 3C is a view for illustrating a user interface.
FIG. 3D is a view for illustrating a user interface.
FIG. 4 is a flowchart.
FIG. 5A is a view for illustrating a user interface of a viewer terminal side.
FIG. 5B is a view for illustrating a user interface of a viewer terminal side.
FIG. 5C is a view for illustrating a user interface of a viewer terminal side.
FIG. 5D is a view for illustrating a user interface of a viewer terminal side.
FIG. 6 is a flowchart.
FIG. 7A is a view for illustrating a user interface of the viewer terminal side.
FIG. 7B is a view for illustrating a user interface of the viewer terminal side.
FIG. 7C is a view for illustrating a user interface of the viewer terminal side.
FIG. 7D is a view for illustrating a user interface of the viewer terminal side.
FIG. 7E is a view for illustrating a user interface of the viewer terminal side.
FIG. 8 is a flowchart.
FIG. 9A is a view for illustrating a user interface.
FIG. 9B is a view for illustrating a user interface.
FIG. 9C is a view for illustrating a user interface.
FIG. 9D is a view for illustrating a user interface.
FIG. 10 is a sequence diagram for commands between a network camera and the viewer terminal.
FIG. 11 is a view for illustrating display coordinates of a capturing screen of the network camera.
FIG. 12 is a flowchart for BoxZoom command reception processing of the network camera.
FIG. 13 is a view for illustrating display coordinates of a capturing screen of the network camera.
FIG. 14 is a view for illustrating a configuration of parameters that the network camera holds.
FIG. 15A is a view for illustrating a user interface of a viewer terminal side.
FIG. 15B is a view for illustrating a user interface of a viewer terminal side.
FIG. 15C is a view for illustrating a user interface of a viewer terminal side.
FIG. 15D is a view for illustrating a user interface of a viewer terminal side.
FIG. 16 is a flowchart of a viewer terminal side.
FIG. 17 is a view for explaining an example of zooming-out control of the network camera.

DESCRIPTION OF EMBODIMENTS

Embodiments of the present invention will now be described hereinafter in detail, using the drawings.

First Embodiment

FIG. 1 is a functional configuration diagram of a camera control system.

In FIG. 1, a viewer terminal 101 and a network camera 103 which are connected to each other via a network 102 are comprised in a camera control system. The viewer terminal 101 is an information processing apparatus which is a control apparatus that provides a user interface for displaying an image that the network camera 103 captures and instructing an image capturing condition under which the network camera 103 captures. The network 102 is a communication line over which IP-based communication is possible such as a LAN, the Internet, or the like. For the network 102, a communication line of a form that is necessary in accordance with one's purpose and objective is implemented, and the form may be wired or wireless. The network camera 103 captures a live image in accordance with designated image capturing conditions, and is capable of distributing the live image via the network 102.

The network camera 103 comprises a capturing unit 104, a control unit 105, and a communication unit 106.

The capturing unit 104 is arranged integrally with the network camera 103, and is a capturing device for acquiring a live image. In the capturing unit 104, for example, it is possible to acquire a 30 fps moving image by acquiring images for 30 frames in one second. In the present embodiment, the capturing unit 104 provides a (coding) function for transforming an acquired video image into digital image data that can be distributed over a network such as JPEG. In the explanation hereinafter, "a live image" or "image data" is explained as digital image data generated by the capturing unit 104.

The control unit 105, in accordance with an instruction of a user, adjusts an image capturing condition, such as an angle of view or capturing direction of the network camera 103, a number of frames in 1 second, a type of image acquired, or the like. The instruction of a user may be performed from the viewer terminal 101 via the network 102, or may be performed directly by a console terminal connected to the network camera 103. Also, an adjustment of an image capturing condition by the control unit 105 can be performed in accordance with a setting value stored in the network camera 103 in advance.

The communication unit 106 transmits via the network 102 image data that the capturing unit 104 acquires to an information processing apparatus (for example, a viewer terminal 101 which is a client, a recording server, or the like) Also, the communication unit 106 receives setting information for controlling the capturing unit 104 set by the information processing apparatus, and the control unit 105 then controls operation of the network camera 103 in accordance with that setting information.

The viewer terminal 101 comprises a communication unit 110, a display unit 111, an input unit 112, a box setting unit 113, a display control unit 114, and a capture control unit 115.

The communication unit 110 receives image data transmitted from the network camera 103. Also, the communication unit 110 transmits to the network camera 103 setting information, control information, or the like, that a user sets using the viewer terminal 101.

The display unit 111 displays image data distributed from the network camera 103. The input unit 112 designates an area in which to perform zooming in on an image, and designates in the current image a portion to be arranged in the center upon zooming out. Also, the input unit 112 performs input in order to change a setting of the network camera 103. In a case where a plurality of the network camera 103 is connected, the input unit 112 performs input of an instruction for displaying captured images of the plurality on the display unit 111 in one screen, and it is possible to select one network camera, and input an instruction for displaying captured images on the display unit 111.

The box setting unit 113 performs setting necessary for displaying a box for indicating a region of interest in a captured image from an area set by the input unit 112. For this setting, for example, calculating coordinates of a position at which to display the box on the display unit 111 as setting information is included. In the present embodiment, a size and a shape of a box are explained as being set/displayed as a rectangle, but it is possible to apply polygonal shapes other than rectangles.

The display control unit 114 performs processing for decoding encoded image data transmitted from the network camera 103, and performing control to display an image, a setting screen, or the like, obtained by decoding on the display unit 111. Also, the display control unit 114 is able to perform control for displaying an image displayed in a box set by the box setting unit 113 to be overlapped with the whole image or a partial image displayed on the display unit 111.

The capture control unit 115, in accordance with the setting information set by the box setting unit 113, the input unit 112, or the like, calculates an image capturing condition that includes an angle of view, a capturing direction, or the like, of the network camera 103, and controls capturing of the network camera 103 by transmitting information indicating the calculated image capturing condition to the network camera 103. Note, in this embodiment, an aspect ratio of a box set in accordance with an input of the input unit 112 does not necessarily match an aspect ratio of an image displayed by the display unit 111, or an image generated by the capturing unit 104 of the network camera 103. For this reason, the capture control unit 115 calculates the image capturing condition (the angle of view, the capturing direction, or the like) by matching the aspect ratio of an image displayed by the display unit 111 or an image generated by the capturing unit 104. Also, the capture control unit 115 is able to instruct various control parameters for communication, or the like, a number of frames for each second, an image coding method of the network camera 103, or the like.

In the network 102, as necessary, it is possible to connect information processing apparatuses such as a recording server, a plurality of the viewer terminal 101, or the like.

FIG. 2 is a view for illustrating a hardware configuration of the viewer terminal 101 and the network camera 103.

In the viewer terminal 101, a CPU 201 performs overall control of the viewer terminal 101. The CPU 201 has a function of executing the display control unit 114, the box setting unit 113, and the capture control unit 115 illustrated in FIG. 1. A secondary storage apparatus 202 stores a program for the CPU 201 to control the viewer terminal 101. A RAM 203 is a memory into which a program that is read out from the secondary storage apparatus 202 is loaded for executing processing. Also, the RAM 203 is used as a storage region for temporarily storing data that is a target of various processing as a temporary storage memory.

A network interface 204 is a circuit over which communication is performed via the network 102, and corresponds to the communication unit 110 of FIG. 1. The network interface 204, for example, is used for receiving image data, setting information, or the like, from the network camera 103, and transmitting setting information to the network camera 103. A display apparatus 205 is a display device such as an LCD that displays image data, a box, or the like, and corresponds to the display unit 111 of FIG. 1. An input apparatus 206 is a keyboard for numeric value input, a pointing device such as a mouse, a touch panel, or the like, for instructing a particular display position of a display region on the display apparatus 205, or the like, and corresponds to the input unit 112 of FIG. 1. In particular, because for a touch panel, an input apparatus is comprised on the display apparatus, a portion instructed by a finger, a pen, or the like, is displayed as is by the display apparatus, and therefor operationality, visibility, and the like is superior.

As described above, the hardware configuration of the viewer terminal 101 comprises similar hardware configuration elements to the hardware configuration elements comprised in a general PC (personal computer). For this reason, various functions realized by the viewer terminal 101 can be implemented as software that operates on a general PC.

In the network camera 103, a CPU 210 is something that performs overall control of the network camera 103, and corresponds to the control unit 105 of FIG. 1. A ROM 211 stores a program for the CPU 210 to control the network camera 103. Here, in place of the ROM 211, a configuration may comprise a secondary storage apparatus equivalent to the secondary storage apparatus 202 of the viewer terminal 101. A RAM 212 is a memory into which a program that is read out from the ROM 211 is loaded for executing processing. Also, the RAM 212 is used as a storage region for temporarily storing data that is a target of various processing as a temporary storage memory.

A network interface 213 is a circuit over which communication is performed via the network 102, and corresponds to the communication unit 106 of FIG. 1. The network interface 213, for example, is used for receiving image data, setting information, or the like, from the viewer terminal 101, and transmitting setting information to the viewer terminal 101. An image capturing apparatus 214 is a capturing device comprising an image sensor for capturing a live image as a moving image or a still image. The image capturing apparatus 214 can perform automatic adjustment of an image capturing condition such as the angle of view, the capturing direction, or the like. Also, the image capturing apparatus 214 comprises panning, tilting, and zooming mechanisms, and executes pan, tilt and zoom (zooming-in control/zooming-out control) operations by control by the CPU 210. The image capturing apparatus 214 is built-into the main body of the network camera 103.

Next, using FIGS. 3A-3D, explanation is given for a user interface of the viewer terminal 101. Note that this user interface is a graphical user interface for a user to perform various operations, and is generated by the display control unit 114 of the viewer terminal 101.

In FIGS. 3A-3D, a display region 301 is a display region of the display apparatus 205 of the viewer terminal 101. For the display region 301, a physical screen of the display apparatus 205 can be used as the display region, and one window may be implemented as the display region 301 in an environment that uses a window-based GUI. A camera image display unit 302 is a region for displaying a live image that is distributed from the network camera 103.

A box 303 is used when an image displayed on the camera image display unit 302 is determined in accordance with an instruction of a user. Here, the box 303 is rectangle-shaped and is defined by a diagonal line that connects first coordinates 304 and second coordinates 305 which are designated by a user. Note that while the box 303 in the embodiment is rectangle-shaped, it may also be a shape having a distortion, and it is possible to realize a box that is set in a polygonal shape format other than a rectangle. The same can be said for the boxes in the second embodiment onward as well.

Using FIGS. 3A-3D and the flowchart of FIG. 4, explanation is given of a setting of the box 303 by the viewer terminal 101, and control of the network camera 103. Note that the processing of FIG. 4 is realized by the CPU 201 of the viewer terminal 101 executing a program read out from the RAM 203. Below, explanation is given for an example of a case in which the box 303 is set by a mouse, which is a pointing device, as the input apparatus 206.

Firstly, by detecting a click operation of a mouse in the camera image display unit 302 (a press of a mouse button), the CPU 201 acquires the first coordinates 304 that indicate an instruction position of the click operation (step S401). After this, the CPU 201 acquires the second coordinates 305 which indicate an instruction position of the mouse that changed in accordance with a movement of the mouse (step S402). Specifically, the second coordinates are coordinates designated after the first coordinates are designated. The CPU 201 starts a display of the box 303 which is defined by the first coordinates 304 and the second coordinates 305 in accordance with the acquisition of the second coordinates 305 (step S403). The CPU 201 monitors the movement of the mouse, and determines a position relation between the first coordinates 304 and the second coordinates 305 acquired from instruction positions of the mouse (step S404).

As a result of the determination, for example in a case where the second coordinates 305 in relation to the first coordinates 304 moved in a first predetermined direction (for example, from right to left along a pan direction) as in FIG. 3A, the CPU 201 determines that the operation of the mouse is a zooming-out control instruction. More specifically, in a case where an origin point is assumed to be the top-left of the camera image display unit 302, an x-coordinate of the second coordinates 305 which is on a horizontal axis is smaller than an x-coordinate of the first coordinates 304, and the operation of the mouse is determined to be a camera zooming-out control instruction. In such a case, the CPU 201 displays the box 303 which is defined by the first coordinates 304 and the second coordinates 305 and in accordance with the size of the box 303 changes the size of the image displayed by the camera image display unit 302 (scaling (enlargement/reduction)) and displays it on the box 303 (step S405A).

Next, by detecting a click operation of the mouse, the CPU 201 detects a designation of the second coordinates 305, and determines whether or not the second coordinates 305 is finalized (step S406). When the result of the determination is that the second coordinates 305 are not finalized (NO in step S406), the processing returns to step S402. On the other hand, when the second coordinates 305 are finalized (YES in step S406), the CPU 201 calculates an image capturing condition including the angle of view and the capturing direction of the network camera 103 based on the size and relative position of the box 303 in relation to the camera display unit 302, and the current angle of view and line of sight direction of the network camera 103 (a zoom scaling factor, a focal distance), and instructs control in accordance with the calculated image capturing condition to the network camera 103 (step S407). In this control, the CPU 201 calculates an image capturing condition including the angle of view and capturing direction of the network camera 103 such that the captured image of the network camera 103 becomes the image of the state currently displayed on the box 303, as in FIG. 3B, for example. In other words, the CPU 201 calculates the angle of view of the network camera 103 (zoom scaling factor and capturing direction) so as to reproduce the same display state as the image displayed on the box 303 at the point in time that the setting of the box 303 is finalized (the point in time when the second coordinates 305 are finalized) (the same position and the same size) in the image displayed on the camera image display unit 302. The viewer terminal 101 controls to the calculated zoom scaling factor and capturing direction by performing an instruction towards the network camera 103.

After that, the CPU 201 deletes the box 303, and displays the captured image received from the network camera 103 on the camera image display unit 302 in accordance with the instruction (step S408). Note that the box 303 upon the zooming-out control may be a configuration for displaying an image of the display target overlappingly on an image on the camera image display unit 302, but it may be that only the box graphic is clearly specified in order to improve visibility.

Meanwhile, in a case where the result of the determination of step S404 is that the second coordinates 305 moved in a second predetermined direction in relation to the first coordinates 304 (for example, from right to bottom) for example, as in FIG. 3C, the CPU 201 determines that the operation of the mouse is a zooming-in control instruction. More specifically, in a case where the x-coordinate of the second coordinates 305 is larger than the x-coordinate of the first coordinates 304, an operation of the mouse is determined as a camera zooming-in control instruction. In such a case, the CPU 201 displays only the box 303 which is defined by the first coordinates 304 and the second coordinates 305 to overlap the image displayed by the camera image display unit 302 (step S405B). In other words, the CPU 201 displays in the box 303 the partial image of the camera image display unit 302 as is.

Next, by detecting a click operation of the mouse, the CPU 201 detects a designation of the second coordinates 305, and finalizes that position as the second coordinates 305 (YES in step S406). The CPU 201 calculates an image capturing condition including the angle of view and capturing direction of the network camera 103, and instructs control in accordance with the calculated image capturing condition towards the network camera 103 (step S407). Until a captured image corresponding to this instruction is received from the network camera 103, an electrically magnified display may be performed for the image currently displayed. Then, when a captured image corresponding to this instruction is received from the network camera, a switch may be made from the image for which the electrically magnified display is performed to the received captured image. In this control, the CPU 201 calculates an image capturing condition including the angle of view and the capturing direction of the network camera 103 such that the captured image of the network camera 103 becomes an image in a state displayed in the box 303 as in FIG. 3D, for example, based on the size and relative position of the box 303 in relation to the camera display unit 302, as well as a current line of sight direction and angle of view (zoom scaling factor, focal distance) of the network camera 103. The viewer terminal 101 controls to the calculated zoom scaling factor and capturing direction by performing an instruction towards the network camera 103. After that, the CPU 201 deletes the box 303, and displays the captured image received from the network camera 103 on the camera image display unit 302 (step S408).

In the present embodiment, explanation was given for an example of a case in which a mouse is used as a pointing device, but limitation is not made to this. If capable of instructing the first coordinates 304 and the second coordinates 305, which are instructed after the first coordinates in turn, and if capable of setting the box 303 in accordance with the coordinates, any device may be used.

Also, the designation of the first coordinates 304 and the second coordinates 305, and the movement can be instructed by the movement of the mouse itself and by a pressed state of a mouse button, but the method of this instruction is not limited. A predetermined operation can instruct the designation of the first coordinates 304 and the second coordinates 305 and a movement by an operation of moving the mouse while maintaining the pressed state of the mouse button (a drag operation), for example.

Also, while the determination of the zooming-in control and the zooming-out control in the present embodiment is performed by detecting that the position of the second coordinates 305 moved in either pan direction (from right to left, or from left to right) in relation to the position of the first coordinates 304 by a mouse operation, limitation is not made to this. For example, it may be determined that the movement from the first coordinates to the second coordinates is in a tilt direction (from top to bottom, or from bottom to top). More specifically, in a case where an origin point is assumed to be the top-left of the camera image display unit 302, and a y-coordinate of the second coordinates 305 which is on a vertical axis is determined to be larger than a y-coordinate of the first coordinates 304, the operation of the mouse is determined to be a camera zooming-out control instruction. Also, in a case where the y-coordinate of the second coordinates 305 is determined to be smaller than the y-coordinate of the first coordinates 304, an operation of the mouse is determined as a camera zooming-in control instruction.

Also, a movement from the first coordinates to the second coordinates for both a pan direction and a tilt direction may be made to be a condition for determination used for the determination of the zooming-in control and the zooming-out control of the camera. For example, in a case where a movement from the top-left to the bottom-right is determined, the camera may be controlled for zooming-out, and in a case where a movement from the top-right to the bottom-left is determined, the camera may be controlled for zooming-in.

As explained above, by virtue of the present embodiment it is possible to determine whether a network camera angle of view control is a zooming-out control or a zooming-in control by the position relation of the first coordinates and the second coordinates for defining the box. Also, in a case of zooming-out control, it is possible to allow a user to easily grasp what kind of image can be acquired by displaying in a box a state of a captured image displayed in accordance with a zooming-out control for a currently displayed captured image upon a zooming-out control.

Also, it is possible to calculate an image capturing condition including a capturing direction, an angle of view, or the like, of a network camera in accordance with an operation towards the box, and make an instruction towards the network camera of a control in accordance with that image capturing condition. For this reason, it is possible to dramatically improve operationality compared to that of an operation unit such as a joystick, a slider, or the like, that sets a capturing direction, an angle of view, or the like, of a network camera directly.

In this way, it is possible to provide a user interface by which it is possible to perform PTZ (pan-tilt-zoom) control of a camera for both zooming-in and zooming-out easily by operating the display unit, and by which a state of an image display after the operation can be understood intuitively.

Second Embodiment

In the second embodiment, explanation will be given for operation in a case where the display apparatus 205 of the viewer terminal 101 is a touch panel. In such a case, a user is able to control the network camera 103 by an operation by a finger of the user, a pointing tool such as a stylus, or the like, in place of the mouse operation in the first embodiment.

FIGS. 5A-5D are user interfaces of the viewer terminal 101, and a display region 501, a camera image display unit 502, and a box 503 respectively correspond to the display region 301, the camera image display unit 302 and the box 303 in the user interface of FIG. 3 of the first embodiment.

Using FIGS. 5A-5D and the flowchart of FIG. 6, explanation is given of a setting of the box 503 by the viewer terminal 101, and control of the network camera 103. Note that the processing of FIGS. 5A-5D is realized by the CPU 201 of the viewer terminal 101 executing a program read out from the RAM 203. Below, explanation is given for an example in a case where the box 503 is operated (a swipe operation) by a finger of a user. Here, the swipe operation is sliding a finger, a pointing tool, or the like, in a particular direction while continuing to touch.

Firstly, by detecting the swipe operation of the finger in the camera image display unit 502, the CPU 201 acquires first coordinates 504 which are the starting point of the swipe operation (step S601). After this, the CPU 201 acquires the second coordinates which indicate an instruction position of the finger that changed in accordance with the swipe operation (step S602). The CPU 201 starts a display of the box 503 which is defined by the first coordinates 504 and second coordinates 505 in accordance with the acquisition of the second coordinates 505 (step S603). The CPU 201 monitors the movement of the finger, and determines a position relation between the first coordinates 504 and the second coordinates 505 acquired from instruction positions of the finger (step S604).

In a case where the result of the determination is that the second coordinates 505 moved in a first predetermined direction in relation to the first coordinates 504 (for example, from bottom-right to top-left) for example, as in FIG. 5A, the CPU 201 determines that the swipe operation is a zooming-out control instruction. In such a case, the CPU 201 confirms whether or not the capturing direction, the angle of view, or the like, of the network camera 103 after control of the network camera 103 calculated based on the position of the box 503 defined by the first coordinates 504 and the second coordinates 505 is within a moveable range/visible range of the network camera 103 (step S605A). In a case where it is within a moveable range/visible range of the network camera 103 (YES in step S605A), the CPU 201 displays the box 503 which is defined by the first coordinates 504 and the second coordinates 505. Also, the CPU 201 displays within the box 503 by changing (scaling (enlargement/reduction)) the size of the image displayed by the camera image display unit 502 in accordance with the size of the box 503 (step S606A).

Meanwhile, in a case where it is outside of the moveable range/visible range of the network camera 103 (NO in step S605A), the CPU 201 prohibits the setting of the box 503, and performs a warning display (for example, a pop-up window) indicating something to that effect (step S606B).

After that, the CPU 201 determines that the second coordinates 505 that the finger instructed immediately preceding the end of the swipe operation are finalized as an end point when the CPU 201 detects the end of the swipe operation by the finger separating from the touch panel (YES in step S607). When the second coordinates 505 are not finalized (NO in step S607), the processing returns to step S601. Meanwhile, when the second coordinates 505 are finalized (YES in step S607), the CPU 201 calculates an image capturing condition including an angle of view and a capturing direction of the network camera 103, and makes an instruction towards the network camera 103 of a control in accordance with the calculated image capturing condition (step S608). In this control, the CPU 201, for example, as in FIG. 5B, calculates an image capturing condition including the angle of view and capturing direction of the network camera 103 such that the image enters a state in which the captured image of the network camera 103 is displayed on the box 503 that is finally set. After that, the CPU 201 deletes the box 503, and displays the captured image received from the network camera 103 on the camera image display unit 502 (step S609).

Meanwhile, in a case where the result of the determination of step S604 is that the second coordinates 505 moved in a second predetermined direction in relation to the first coordinates 504 (for example, from top-left to bottom-right) as in FIG. 5C, for example, the CPU 201 determines that the swipe operation is a zooming-in control instruction. In such a case, the CPU 201 displays only the box 503 which is defined by the first coordinates 504 and the second coordinates 505 to overlap the image displayed by the camera image display unit 502 (step S606C). In other words, the CPU 201 displays in the box 503 the partial image of the camera image display unit 502 as is.

Next, the CPU 201 calculates an image capturing condition including the angle of view and the capturing direction of the network camera 103 when the position that the finger instructed immediately preceding the end of the swipe operation is finalized as the second coordinates 505 (YES in step S607). Then, the CPU 201 makes an instruction towards the network camera 103 for a control in accordance with the calculated image capturing condition (step S608). In this control, the CPU 201 calculates an image capturing condition including the angle of view and capturing direction of the network camera 103 such that the image enters a state in which the captured image of the network camera 103 is displayed on the box 503 that is finally set as in FIG. 5D, for example. After that, the CPU 201 deletes the box 503, and displays the captured image received from the network camera 103 on the camera image display unit 502 in accordance with the instruction (step S609).

In the second embodiment, explanation is given of an example of a case in which an instruction of coordinates is performed using a finger on a touch panel, but limitation is not made to this. If capable of instructing the first coordinates 504 and the second coordinates 505 which are instructed after the first coordinates in turn, and if capable of setting the box 503 in accordance with the coordinate, any pointing tool may be used.

Also, the designation of the first coordinates 504 and the second coordinates 505 on the touch panel, the movement, or the like, can be instructed by a swipe operation, but the instruction method is not limited to this. By a predetermined operation such as, for example, performing touch by a finger two times (a double tap), it is possible to instruct the designation of the first coordinates 504 and the second coordinates 505, a movement, or the like.

Also, while the determination of the zooming-in control and the zooming-out control was performed by the above described swipe operation, limitation is not made to this. In the description above, a zooming-in control and a zooming-out control are determined based on a movement direction of second coordinates in relation to first coordinates, but they may be determined simply by a position relation between the first coordinates and the second coordinates. For example, in a case where the top-left and the bottom-right of the box 503 are defined by the first coordinates and the second coordinates, zooming-in control is determined, and in a case where the bottom-left and the top-right are defined by the first coordinates and the second coordinates of the box 503, the zooming-out control is determined.

As explained above, by virtue of the second embodiment, it is possible to achieve the same effect as in the first embodiment with a swipe operation.

Also, by calculating an angle of view and a capturing direction after controlling the network camera upon the setting of the box, and confirming whether or not it is in the moveable range of the network camera, whether or not it is within a visible range designated in advance, or the like, it is possible to confirm whether or not to control the network camera at the point in time of the designation.

Third Embodiment

In the third embodiment, explanation will be given for an operation in a case where a panorama image is displayed outside of the box when the box is set in the second embodiment.

For doing so, the viewer terminal 101 controls the network camera 103, and images within a moveable range (within a visible range), in which capturing is possible by the network camera 103 changing the capturing direction, are acquired in advance. The timing of this acquisition may be upon an activation of the network camera 103, or acquisition from the network camera 103 may be performed automatically at a fixed time or at fixed intervals. Also, the viewer terminal 101 generates a panorama image corresponding to images of the entire capturing range that can be captured by the network camera 103 from the acquired images, and stores this in the secondary storage apparatus 202, for example.

FIGS. 7A-7E are user interfaces of the viewer terminal 101, and a display region 701, a camera image display unit 702, and a box 703 respectively correspond to the display region 301, the camera image display unit 302 and the box 303 in the user interface of FIG. 3 of the first embodiment. Here, FIG. 7A illustrates the display state of the viewer terminal 101 prior to operation.

Using FIGS. 7A-7E and the flowchart of FIG. 8, explanation is given of a setting of the box 703 by the viewer terminal 101, and control of the network camera 103. Note that the processing of FIGS. 7A-7E is realized by the CPU 201 of the viewer terminal 101 executing a program read out from the RAM 203. Below, explanation is given for an example in a case where the box 503 is operated (a touch operation) by a finger of a user.

Firstly, by detecting substantially simultaneous touches by two fingers in the camera image display unit 502, the CPU 201 acquires first coordinates 704 and second coordinates 705 (step S801 and step S802). Note that the simultaneous touches may be substantially simultaneous; for example, even in a case where the second coordinates 705 are detected within a predetermined amount of time that is treated as being simultaneous from the detection of the first coordinates 704, it is detected as a simultaneous touch.

Next, The CPU 201 starts a display of the box 703 which is defined by the first coordinates 704 and the second coordinates 705 (step S803). The CPU 201 determines a position relation between the first coordinates 704 and the second coordinates 705 acquired from instruction positions of the finger (step S804).

In a case where the result of the determination is that the first coordinates 704 and the second coordinates 705 are in a first predetermined position relation (for example, a combination of top-right and bottom-left (the slope of the line including the first coordinates 704 and the second coordinates 705 is positive)) as in FIG. 7B, for example, the CPU 201 determines that it is a zooming-out control instruction. In such a case, the CPU 201 displays the box 703 which is defined by the first coordinates 704 and the second coordinates 705 and in accordance with the size of the box 703, changes the size of the live image displayed by the camera image display unit 702 (reduction) and displays it in the box 703 (step S805A). Also, at this time, the CPU 201 changes the size of the panorama image stored in the secondary storage apparatus 202 in advance in accordance with the size of the box 703 and displays it in the camera image display unit 702 outside of the box 703 (step S806A).

Next, by detecting that the touch operation ends by the 2 fingers separating from the touch panel, the CPU 201 detects the positions that the 2 fingers instructed immediately preceding the end of the touch operation, and determines whether or not the first coordinates 704 and the second coordinates 705 are finalized (step S807). When the first coordinates 704 and the second coordinates 705 are not finalized (NO in step S807), the processing returns to step S801. Meanwhile, when the first coordinates 704 and the second coordinates 705 are finalized (YES in step S807), the CPU 201 calculates an image capturing condition including an angle of view and a capturing direction of the network camera 103, and makes an instruction towards the network camera 103 of a control in accordance with the calculated image capturing condition (step S808). In this control, the CPU 201 calculates an image capturing condition including the angle of view and capturing direction of the network camera 103 such that the image enters a state in which the captured image of the network camera 103 is displayed on the box 703 that is finally set as in FIG. 7C, for example. After that, the CPU 201 ends the display of the box 703, switches to the captured image received from the network camera 103 from the display of the panorama image, and displays to the camera image display unit 502 (step S809).

Meanwhile, in a case where the result of the determination of step S804 is that the first coordinates 704 and the second coordinates 705 are in a second predetermined position relation (for example, a combination of top-left and bottom-right (the slope of the line including the first coordinates 704 and the second coordinates 705 is negative)) as in FIG. 7D, for example, the CPU 201 determines a zooming-in control instruction. In such a case, the CPU 201 displays only the box 703 which is defined by the first coordinates 704 and the second coordinates 705 to overlap the image displayed by the camera image display unit 702 (step S805B). In other words, the CPU 201 displays the partial image of the camera image display unit 702 as is in the box 703.

Next, by detecting that the touch operation ends by the 2 fingers separating from the touch panel, the CPU 201 detects the positions that the 2 fingers instructed immediately preceding the end of the touch operation, and finalizes those positions as the first coordinates 704 and the second coordinates 705 (YES in step S807). After that, the CPU 201 calculates an image capturing condition including the angle of view and capturing direction of the network camera 103, and instructs control in accordance with the calculated image capturing condition towards the network camera 103 (step S808). In this control, an image capturing condition including the angle of view and the capturing direction of the network camera 103 is calculated such that the captured image of the network camera becomes an image in a state displayed in the box 703 set finally, as in FIG. 7E. After that, the CPU 201 deletes the box 703, and displays the captured image received from the network camera 103 on the camera image display unit 702 (step S809).

In the third embodiment, the first coordinates 704 and the second coordinates 705 on the touch panel are instructed by touching two points simultaneously with one's fingers, but limitation is not made to this. For example, configuration may also be taken such that the first coordinates 704 and the second coordinates 705 are instructed by a swipe operation, combining with the second embodiment, and enlargement or reduction or movement of the box 703 itself is performed.

Also, the determination of the zooming-in control and the zooming-out control is performed by detecting whether or not the first coordinates 704 and the second coordinates 705 by touch operations on two points are in multiple types of predetermined position relations, but limitation is not made to this. Here, the multiple types of predetermined position relations are when the slope of the line segment connecting the first coordinates 704 and the second coordinates 705 is positive and when it is negative. The determination conditions used for this determination may be the inverse of these predetermined position relationships.

As explained above, by virtue of the third embodiment, in addition to the effect explained in the second embodiment, it is easy to understand the state of the image after the camera control because the image is displayed outside of the frame of the box upon the zooming-out control using a panorama image stored in advance, and it is possible to prevent having to redo an operation after the camera is actually moved.

Fourth Embodiment

In the above described first-third embodiments, explanation is given for processing on the side of the viewer terminal 101 mainly, but below, explanation is given for communication processing between the viewer terminal 101 and the network camera 103, and operation on the side of the network camera 103. More specifically, in the first-third embodiments are embodiments in which the network camera 103 receives information regarding first coordinates 904 and second coordinates 905 designated on the viewer terminal 101 side. In other words, these are embodiments in which the network camera 103 calculates image capturing conditions based on the first coordinates 904 and the second coordinates 905, and fulfills a role as a control apparatus.

In the fourth embodiment, as in the first embodiment, the CPU 201 acquires the first coordinates 904 by detecting a mouse click operation in a camera image display unit 902. After detecting an instruction of the first coordinates, the CPU 201 acquires the second coordinates 905 which indicate the instruction position of the mouse that changed in accordance with the movement of the mouse. The CPU 201 starts a display of a box 903 which is defined by the first coordinates 904 and the second coordinates 905 in accordance with the acquisition of the second coordinates 905. The CPU 201 monitors the movement of the mouse, and determines a position relation between the first coordinates 904 and the second coordinates 905 acquired from instruction positions of the mouse.

In a case where as the result of the determination is that the second coordinates 905 are positioned in a first predetermined direction to the left or towards the bottom in relation to the first coordinates 904 as in FIG. 9A, for example, a zooming-out control is determined, and in addition to displaying the box 903, the size of the image displayed by the camera image display unit 902 is changed (reduced) in accordance with the size of the box 903, and display in the box 903 is performed. In FIG. 9A, an example is illustrated in which a reduced display of the image displayed in the camera image display unit 902 is performed for the box 903.

Next, by detecting a click operation of the mouse, the CPU 201 detects a designation of the second coordinates 905, and determines whether or not the second coordinates 905 are finalized. In a case where the result of the determination is that the second coordinates 905 are finalized, the CPU 201 transmits information regarding the finalized first coordinates 904 and second coordinates 905 to the network camera 103 as a BoxZoom command, which is explained below.

The CPU 210 on the side of the network camera 103 determines a position relation between the first coordinates 904 and the second coordinates 905 in the pan direction (a horizontal direction), for example, similarly to the CPU 201 of the viewer terminal 101. In a case where the result of the determination is that the second coordinates 905 are positioned on the left side in relation to the first coordinates 904, it is determined as a zooming-out control. The CPU 210 calculates an image capturing condition including the angle of view and capturing direction of the network camera 103, and instructs control in accordance with the calculated image capturing condition towards the image capturing apparatus 214. In this control, the CPU 210 calculates an image capturing condition including an angle of view and a capturing direction of the image capturing apparatus 214 such that an image in the state currently displayed in the box 903 is arranged in a region of the box 903, as in FIG. 9B. In other words, the CPU 210 calculates the angle of view and capturing direction of the network camera 103 so as to reproduce the same display state (the same position and the same size) as the image displayed on the box 903 at the point in time that the setting of the box 903 was finalized (the point in time when the second coordinates 905 is finalized) in the image displayed on the camera image display unit 902.

Meanwhile, as in FIG. 9C, in a case where the second coordinates 905 are positioned in a second predetermined direction in relation to the first coordinates 904 (for example, right or above), the CPU 201 determines that the operation of the mouse is a zooming-in control instruction. In such a case, the CPU 201 displays only the box 903 which is defined by the first coordinates 904 and the second coordinates 905 to overlap the image displayed by the camera image display unit 902. In other words, the CPU 201 displays the partial image of the camera image display unit 902 as is in the box 903.

Next, by detecting a click operation of the mouse, the CPU 201 detects a designation of the second coordinates 905, and finalizes that position as the second coordinates 905. In a case where the second coordinates 905 is finalized, the CPU 201 transmits information regarding the finalized first coordinates 904 and second coordinates 905 to the network camera 103 as a BoxZoom command, which is explained below.

The CPU 210 on the network camera side calculates an image capturing condition including the angle of view and capturing direction of the network camera 103, and instructs control in accordance with the calculated image capturing condition towards the capturing unit 104. In this control, the CPU 210 calculates an image capturing condition including the angle of view and capturing direction of the image capturing apparatus 214 such that the captured image of the network camera 103 becomes the image in the state that is currently displayed on the box 903 as in FIG. 9D, for example. Meanwhile, the CPU 201 on the side of the viewer terminal 101 deletes the box 903, and displays the captured image received from the network camera 103 on the camera image display unit 902.

Continuing on, FIG. 10 illustrates a typical BoxZoom command sequence that changes the angle of view and the capturing direction between the viewer terminal 101 which is a client and the network camera 103. The transactions explained here indicate pairs of a command transmitted from the viewer terminal 101 to the network camera 103, and a response that the network camera 103 returns to the viewer terminal 101 in response to that.

A transaction 1200 is a transaction of a Subscribe command. By execution of this command, the network camera 103 transmits an event that occurred internally to the viewer terminal 101.

A transaction 1201 is a transaction of a GetServiceCapabilities command. The GetServiceCapabilities command is a command that instructs so that the network camera 103 returns capabilities information illustrating a function that the network camera 103 supports. In this capabilities information, the network camera 103 includes a function that calculates an angle of view and a direction of the network camera 103 based on the first coordinates and second coordinates set in the camera display unit of the viewer terminal 101. The command corresponding to this function is called a BoxZoom command, and as described above, identification information (a BZC token), and information related to first coordinates and second coordinates is included in the command. Hereinafter, BoxZoom, SetBoxZoom, and SetBoxZoomConfiguration will be abbreviated to BZ, SetBZ and SetBZC.

A transaction 1202 is a transaction of a GetBZC command. By this command, the viewer terminal 101 acquires a BZC list that the network camera 103 holds. In the BZC list, settings such as a result of comparison of the size of the first coordinates and the second coordinates, a setting as to whether to perform a zooming-out control or a zooming-in control on the angle of view based on the result of the movement direction determination, a setting of a zooming-out control and zooming-in control ratio, a setting of a computation method for computing the direction of the network camera (pan, tilt), or the like, are included.

A transaction 1203 is a transaction of a SetBZC command. By this command, the network camera 103 sets various BZC parameters. A SetBZC response command indicating that the BZC setting is updated is transmitted to the viewer terminal 101. After the command is completed, the network camera 103 transmits a BZC modification notification event to notify the viewer terminal 101 that there was a change in the BZC.

A transaction 1204 is a transaction of a BoxZoom command. By this command, the viewer terminal 101 transmits to the network camera 103 a BZC token (identification information), first coordinates (X1, Y1), and second coordinates (X2, Y2) as a BZ command. The network camera 103, having received the BZ command, stores the BZC token, the first coordinates and the second coordinates in the RAM 212, and transmits the BZ response to the viewer terminal 101.

FIG. 11 is something that displays a captured image of the network camera 103, which is displayed on the camera image display unit 902 of the viewer terminal 101, in a coordinate system defined by Onvif (Open Network Video Interface Forum). In Onvif, as the coordinate system of the image capturing region, the X coordinates are distributed in a range from −1 to +1, and similarly, the Y coordinates are distributed in a range from −1 to +1. Using FIG. 11, explanation is given for an example of the coordinate system of the fourth embodiment and an image capturing condition control computation are explained by FIGS. 9A-9D and FIG. 10.

In the coordinate system illustrated in FIG. 11, the first and second coordinate values detected by the viewer terminal 101 are stored in the RAM 203, and furthermore the viewer terminal 101 transmits to the network camera 103 a BZ request including the BZ command.

Explanation will be given for the BZ processing of the network camera 103 using the flowchart of FIG. 12. Note that processing for computing the angle of view of the network camera 103 explained below can be applied to the first-third embodiments as well. Also, the processing of FIG. 12 is realized by the CPU 210 of the network camera 103 executing a program read out from the RAM 212.

In step S1500, the CPU 210 of the network camera 103 that received the BZ request stores in the RAM 212 the BZC token, the first coordinate values (X1, Y1) and the second coordinate values (X2, Y2) designated by the BZ command.

Next, in step S1501, the CPU 210 computes the capturing direction of the network camera 103 from the stored first coordinate values (X1, Y1) and second coordinate values (X2, Y2). This arithmetic equation is the following equation. Assuming that capturing direction center coordinates values 906 after the change is (X3, Y3):

$$(X3, Y3) = ((X1+X2)/2, (Y1+Y2))$$

Next, in step S1502, the CPU 210 stores calculated center coordinates values 906 (X3, Y3) in the RAM 212.

Next, in step S1503, the CPU 210 determines whether it is a zooming-out control instruction or a zooming-in control instruction based on the size relationship (comparison) between the first coordinate values (X1, Y1) and the second coordinate values (X2, Y2). Here, the angle of view controlling scaling factor after the change is assumed to be Z.

In a case where X1=X2, the CPU 210 determines that there is no change in the angle of view scaling factor, stores the value Z=1 in the RAM 212, and the processing proceeds to step S1507.

In a case where X1<X2, the processing proceeds to step S1504, and the CPU 210 determines that it is a zooming-in control, and computes an angle of view controlling scaling factor Z shown by the following equation:

$$Z = |2/(X1-X2)|$$

Note that are arithmetic symbols indicating the absolute value. For example, in a case where X1=−0.7 and X2=−0.2, Z=4, and control is for a zoom scaling factor for zooming-in 4× relatively with respect to the current zoom scaling factor.

In a case where X1>X2, the processing proceeds to step S1505, and the CPU 210 determines that it is a zooming-out control (zoom out), and computes an angle of view controlling scaling factor shown by the following equation:

Here, the angle of view controlling scaling factor after the change is assumed to be Z.

$$Z = |(X1-X2)/2|$$

Note that || are arithmetic symbols indicating the absolute value. For example, in a case where X1=−0.2 and X2=−0.7, Z=0.25, and control is for a zoom scaling factor for zooming-out 0.25× relatively with respect to the current zoom scaling factor.

Note that in step S1505, in place of the above described processing, for example, zooming-out control for zooming may be performed as follows.

(A) Irrespective of the first coordinate values and the second coordinate values, the zoom control amount (zoom out amount) is fixed. For example, control such as reducing the focal distance from a current focal distance to a predetermined distance (for example, −20 mm) is performed.

(B) Irrespective of the first coordinate values and the second coordinate values, control is performed for zooming to a maximum zooming-out (a wide-angle end).

(C) The zoom control amount may be determined based on the ratio of the size of the camera image display unit 902 (coordinate system range) and the size of the box 903 which is defined by the first coordinate values and the second coordinate values, the maximum zoom amount, and the current zoom amount. More specifically, a ratio of the size of the camera image display unit 902 which is an image capturing region and the size of the box 903—for example, the ratio of the length of one side of the rectangle-shaped box obtained from the difference between the first coordinate value and the second coordinate value to the X-axis range of the coordinate system—is obtained. For example, assuming that the first coordinate value X1=−0.2 and the second coordinate value X2=−0.7, the difference is 0.5. The x-axis range of the coordinate system is 2.0, so the ratio of the size of the image capturing region and the box 903 is 0.4.

Then, the calculated zoom amount is obtained by a multiplication of the difference between the maximum zoom amount and the current zoom amount, and the ratio of the size of the camera image display unit 902 which is the image capturing region and the box 903. That is, as shown in FIG. 17, a zoom amount to be controlled=(the maximum zoom amount−the current zoom amount)×(the ratio of the sizes of the box 903 and the camera image display unit 902). Also at this time, similarly to the above described explanation, it is controlled so that the center of the designated box becomes the center of the image capturing region (the camera image display unit 902) after the change of the capturing direction. Note that, in accordance with a request from the viewer terminal 101, the CPU 210 may switch the type of the zooming control for the zoomed-out side for the above (A)-(C), for example.

When the computation of the angle of view controlling scaling factor is completed, the processing proceeds to step S1506, the CPU 210 stores the angle of view controlling scaling factor in a storage unit of the control unit 105 and the processing proceeds to step S1507.

In step S1507, the CPU 210 determines whether or not the capturing direction coordinate values and the angle of view controlling scaling factor stored in the storage unit of the control unit 105 are in a movable/visible range of the camera. In a case where it is determined not to be in the movable/visible range of the camera ("NO" in step S1507), the processing proceeds to step S1508, and the CPU 210 transmits Invalid to the viewer terminal 101, and completes the BoxZoom command processing.

On the other hand, in a case where it is determined to be in the movable/visible range of the camera ("YES" in in step S1507), the processing proceeds to step S1509, the CPU 210 drives panning and tilting so that the capturing center coordinate of the camera becomes the center coordinates values (X3, Y3) stored in the storage unit. Next, the zoom of the network camera 103 is driven to the angle of view controlling scaling factor stored in the storage unit, and the network camera 103 is controlled to the instructed image capturing condition by the BZ command request from the viewer terminal 101. Next, in step S1510, the CPU 210 returns a normal response to the viewer terminal 101. In step S1511, the CPU 210 completes the BZ command reception processing.

Next, explanation is given for the processing example in a case where X1=X2 using FIG. 13. In step S1503, in a case where X1=X2, the CPU 210 determines that there is no change in the angle of view scaling factor, and stores the value Z=1 in the RAM 212. Then, in step S1507, the CPU 210 determines whether or not it is in a movable/visible range of the camera. In a case where it is determined not to be in the movable/visible range of the camera, the CPU 210, in step S1508, transmits Invalid to the viewer terminal 101, and completes the BoxZoom command processing.

On the other hand, in a case where it is determined to be in a movable/visible range of the camera in step S1507, the processing proceeds to step S1509, the CPU 210 controls the capturing direction so that the center coordinates of the image capturing apparatus 214 move from the current (0,0) to (X3 (=X1), Y3). At this time, Y3 is the average value of the Y coordinate of the first and second coordinates. Next, in step S1510, the CPU 210 returns a normal response to the viewer terminal 101. Then, in step S1511, the CPU 210 completes the BZ command reception processing.

A structure of parameters held by the RAM 212 of the network camera 103, or the secondary storage apparatus (not shown) under the fourth embodiment is shown graphically in FIG. 14. In FIG. 14, MediaProfiles 3000, 3001 and 3002 are parameter sets for associating and storing various setting items of the network camera 103. Hereinafter, there are cases in which MediaProfile is abbreviated to be MP. Each of the MPs 3000, 3001 and 3002 is holding a Profile Token which is an ID of MP.

Also, each of the MPs 3000, 3001 and 3002 is holding links to various setting items. These various setting items include a VideoSourceConfiguration 3011 and VideoEncoderConfigurations 3020, 3021 and 3031 described later. Hereinafter, there are cases where VideoSourceConfiguration is abbreviated to be VSC.

A VS 3010 in FIG. 14 is an accumulation of parameters indicating the capabilities of one image capturing apparatus 214 that the network camera 103 has. Here, the VS 3010 includes parameters such as the VideoSourceToken which is the ID of the VS 3010 and resolution which indicates the resolution of an image which the capturing unit 104 can output. VECs 3020 and 3021 are accumulations of parameters for associating the encoder setting for encoding image data with the MP.

The network camera 103 encodes the captured image outputted from the capturing unit 104 based on the content of the VS and the VSC, based on the VEC, and distributes the result to the viewer terminal 101 as image data through the communication unit 106.

BZCs 3030 and 3031 in FIG. 14 are accumulations of parameters for associating settings relating to the capturing direction of the network camera 103, zooming-in control and zooming-out control with the MP. The BZC includes a BZC token which is the ID of the BZC, the first and second coordinate values, and parameters for setting the capturing direction of the network camera, zooming-in control, and zooming-out control by the comparison of the first and second coordinate values.

In the fourth embodiment, the zooming-in control is performed in a case where the second X coordinate (X2) is larger than the first X coordinate (X1), i.e. X1<X2, but it is possible to set the zooming-out control using BZC settings.

Also, in the fourth embodiment, explanation was given for an example where the controlling of the angle of view (the zooming control) is not performed and only driving control for the Y coordinate (tilting) is performed in a case where the first X coordinate and the second X coordinate are equal, i.e. X1=X2, but limitation is not made to this. For example, it is possible to set to restrict the Y-axis direction control of the image capturing apparatus 214 considering the appropriate coordinates not to be set even in a case where Y1≠Y2 when X1=X2 by the setting of the BZC.

Note that, the above described BZC setting example is nothing more than an example, and it is possible to increase or decrease the apparent sensitivity by setting a coefficient in the arithmetic equation.

Fifth Embodiment

In this fifth embodiment, explanation will be given for processing for notifying the user as to how the camera would operate in a case where the box is finalized in the current state upon the box setting in the first-fourth embodiments.

The display processing by the viewer terminal 101 is explained using flowcharts in FIGS. 15A-15D and FIG. 16.

Note that, in the viewer terminal 101, the procedure shown in FIG. 16 is realized by the CPU 201 loading a program stored in the secondary storage apparatus 202 to the RAM 203 and executing it. Alternatively, a portion or the entirety of processing shown in FIG. 16 may be performed by hardware mounted in the viewer terminal 101.

FIGS. 15A-15D are examples of a user interface of the viewer terminal 101, and a display region 1001, a camera image display unit 1002, and a box 1003 correspond to the display region 301, the camera image display unit 302, and the box 303 of the user interface in FIGS. 3A-3D. A panorama image is displayed on a panorama display unit 1008. The panorama image is an image made by combining images captured dividing over a plurality of times in advance by changing the image capture direction of the camera. That is, the user can confirm a wider region than that of the current angle of view of the camera using the panorama image. A box 1009 for indicating which region the network camera 103 is capturing currently is displayed on the panorama display unit 1008. Explanation is given for a case where a panorama image is displayed in the present embodiment, but the embodiment is not limited to this. A box indicating a range where image capturing is possible by the camera changing the image capture direction may alone be displayed, not displaying the panorama image. Even in such a configuration, the user can recognize the position and the size of the range where the camera is capturing currently in the range where image capturing is possible by changing the image capture direction of the camera.

In FIG. 16, the first coordinates and the second coordinates set by the user performing a mouse click are acquired (step S1001, step S1002). Based on the acquired first coordinates and second coordinates, the setting of the box 1003 is started (step S1003).

At this time, similarly to the processing shown in the first-fourth embodiments, the determination of the position relation of the acquired coordinates is performed (step S1004). In a case where it is determined to be the zooming-out control, an icon 1006 for indicating the zooming-out control is displayed on the camera image display unit 1002 as shown in FIG. 15A (step S1005A). Also, in a case where it is determined to be the zooming-in control, an icon 1007 for indicating the zooming-in control is displayed on the camera image display unit 1002 as shown in FIG. 15C (step S1005B). In this way, by displaying the icon, in a case where the current box is finalized, the user can recognize whether the zooming-out control or the zooming-in control is performed on the camera.

For example, when the second coordinates are designated in the top-left or the bottom-left of the first coordinate, it is determined to be the execution of the zooming-out control. In such a case, the CPU 201 displays the icon 1006 for indicating that the zooming-out control is performed on the operation screen.

For example, when the second coordinates are designated in the bottom-right or the top-right of the first coordinate, it is determined to be the execution of the zooming-in control. In such a case, the CPU 201 displays the icon 1007 for indicating that the zooming-in control is performed on the operation screen. In a similar way with a case of the zooming-out control, this icon 1007 can be displayed on the captured image. This icon may be displayed on the captured image as shown in FIG. 15C, but limitation is not made to this.

In this way, in accordance with the position relation of the first coordinates and the second coordinates, the controlling for switching the icon displayed on the operation screen is executed.

Also, the icon may be displayed in the box 1003, and may be displayed only in a case where the size of the box 1003 is larger than or equal to the fixed size so as not to impede the setting operation of the box.

In other words, in a case where the range designated by the first coordinates and the second coordinates is larger than the predetermined size, the icon is displayed in the designated area (in the box 1003). On the other hand, in a case where the range designated by the first coordinates and the second coordinates is smaller than the predetermined size, it is possible to display the icon outside of the designated area.

Note that, whether or not the range designated by the first coordinates and the second coordinates is larger than the predetermined size can be determined by the area of the selected range, or the length of a line segment joining the first coordinate and the second coordinate, for example. That is, in a case where the area of the selected range is larger than the predetermined area, or a case where the length of a line segment joining the first coordinate and the second coordinate is longer than the predetermined length, it can be determined that the selected range is larger than the predetermined size.

Alternatively, configuration may be taken such that the icon is not displayed in a case where the box setting is performed again after the camera control is performed once. Also, the icons are not limited to the 2 types for the zooming-out control and the zooming-in control; in a case where the position upon the setting in the box is outside of the capturable range of the camera, a different icon may be displayed. Furthermore, limitation is not made to notification using the icons; the notification may be performed by a method for distinguishing whether it is the zooming-out control or the zooming-in control, such as a message or a change of a display method of the box. For example, the color of the box 1003 indicating the range designated by the first coordinates and the second coordinates may be changed in accordance with the position relation of the first coordinates and the second coordinates. That is, the color of the box may be caused to be different between a case where the position relation of the first coordinates and the second coordinates is the position relation for instructing the zooming-out control and a case where the position relation is for instructing the zooming-in control.

Next, in a case where the position of the box is set, a box 1010 for indicating which region the camera captures is displayed on the panorama display unit 1008 (step S1006). Note, the position and the size of the position box after the movement may be changed in real-time according to the movement of the second coordinate even before the position of the box is finalized.

The zooming-out control is performed in FIG. 15A, so the box 1010 for indicating the angle of view after the zooming-out control becomes larger than the box for showing the current angle of view. Also, the zooming-in control is performed in FIG. 15C, so the box 1010 for indicating the angle of view after the zooming-in control becomes smaller than the box 1009 for showing the current angle of view. In this way, by displaying the box 1010 for indicating the angle of view after the controlling and a box 910 for showing the current angle of view, the user can recognize how the angle of view of the camera is controlled.

After this, when the first coordinates and the second coordinates are finalized (step S1007), the angle of view and the capturing direction of the network camera 103 is calculated based on the finalized coordinates, an instruction is given to the network camera (step S1008).

Then, the image of the camera is displayed on the image display unit deleting only the displaying of the boxes 1009 and 1010 (step S1009). An image as in FIG. 15B is displayed as the result of the designation of the coordinates shown in FIG. 15A, and an image as in FIG. 15D is displayed as the result of the designation of the coordinates shown in FIG. 15C.

As explained above, according to the viewer terminal in the present embodiment, it is easy to imagine the state of the image after the camera control, and it is easy to control the camera as predicted.

USABILITY IN INDUSTRY

The user interface of the viewer terminal is suitable in a case where a setting of a monitoring camera using an image is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-209397, filed Oct. 10, 2014, and 2014-234911, filed Nov. 19, 2014 which are hereby incorporated by reference herein in their entirety.

The invention claimed is:

1. A control apparatus comprising:
one or more hardware processors; and
one or more memory for storing instructions to be executed by the one or more hardware processors,
wherein, when the instructions stored in the one or more memory are executed by the one or more hardware processors, the control apparatus functions as units comprising:
(1) a display control unit configured to cause a display unit to display a captured image captured by an image capturing apparatus, and
(2) a determination unit configured to execute determination processing for determining, based on a positional relation between a first position and a second position designated by an operation with respect to the captured image displayed on the display unit, whether the operation is an operation that causes zoom-in processing to be executed or an operation that causes zoom-out processing to be executed,
wherein the determination unit (a) determines that the operation is an operation that causes zoom-in processing to be executed if the second position relative to the first position is positioned at bottom-right, and (b) determines that the operation is an operation that causes zoom-out processing to be executed if the second position relative to the first position is positioned at top-left,
wherein, if the determination unit determines the operation is an operation that causes zoom-in processing to be executed, the display control unit causes the display unit to display, on the captured image, first information indicating zoom-in processing and a box defined by the first and second positions according to the operation, while the operation is being performed,
wherein, if the determination unit determines the operation is an operation that causes zoom out processing to be executed, the display control unit causes the display unit to display, on the captured image, second information indicating zoom-out processing and a box defined by the first and second positions according to the operation, while the operation is being performed, and
wherein the second information is different from the first information.

2. The control apparatus according to claim 1, wherein, when the instructions stored in the one or more memory are executed by the one or more hardware processors, the control apparatus further functions as:
a control unit configured to, when the operation completes, cause the image capturing apparatus to execute either the zoom-in processing or the zoom-out processing based on the result of the determination processing.

3. The control apparatus according to claim 2, wherein, if the determination unit determines that the operation in relation to the captured image is an operation that causes an execution of the zoom-out processing and the operation completes, the control unit causes the image capturing apparatus to execute the zoom-out processing so that an angle of the image captured by the image capturing apparatus corresponds to an area defined by the first position and the second position.

4. The control apparatus according to claim 2, wherein the operation is performed via a touch panel, and the control unit, in response to a transition from a state in which a pointing device is not touching the touch panel to a state in which the pointing device is touching, makes the position of the touch be the first position, and in response to transition from the state in which the pointing device is touching the touch panel to the state in which the pointing device is not touching, determines that the operation completes.

5. The control apparatus according to claim 2, wherein, when the first position is designated with respect to the captured image and then a position different from the first position is designated, the control unit determines that the operation completes.

6. The control apparatus according to claim 2, wherein, if the determination unit determines that the operation in relation to the captured image is an operation that causes an execution of the zoom-out processing and the operation completes, the control unit causes the zoom-out processing to execute according to a predetermined zoom value.

7. The control apparatus according to claim 6, wherein the predetermined zoom value is a zoom value corresponding to a state in which the control unit causes image capturing to be performed at a maximum zoom-out of the image capturing apparatus.

8. The control apparatus according to claim 2, wherein, if the determination unit determines that the operation in relation to the captured image is an operation that causes an execution of the zoom-in processing and the operation completes, the control unit causes the image capturing apparatus to execute the zoom-in processing so that an angle of the image captured by the image capturing apparatus corresponds to an area defined by the first position and the second position.

9. The control apparatus according to claim 1, wherein the determination unit executes the determination processing making a slope of a line connecting the first position and the second position be a relative position of the second position with respect to the first position.

10. The control apparatus according to claim 1, further comprising the image capturing apparatus.

11. The control apparatus according to claim 1, wherein the first information is an icon corresponding to the result of the determination processing, and
wherein the second information is an icon corresponding to the result of the determination processing.

12. The control apparatus according to claim 1, wherein the zoom-in processing is processing that causes the image capturing apparatus to zoom-in and the zoom-out processing is processing that causes the image capturing apparatus to zoom-out.

13. The control apparatus according to claim 1, wherein the display control unit displays, as the box, a rectangle having a diagonal line defined by the first and second positions.

14. The control apparatus according to claim 13, wherein, if the determination unit determines that the operation is an operation that causes zoom-in processing, a field within the displayed box is set as a new angle to be shot by the image capturing apparatus, and
   wherein if the determination unit determines that the operation is an operation that causes zoom-out processing, a new angle to be shot by the image capturing apparatus is set so that the currently displayed entire image is displayed within the displayed box.

15. A control method comprising:
   a display control step of causing a display unit to display a captured image captured by an image capturing apparatus; and
   a determination step of executing determination processing for determining, based on a positional relation between a first position and a second position designated by an operation with respect to the captured image displayed in the display step, whether the operation is an operation that causes zoom-in processing to be executed or an operation that causes zoom-out processing to be executed,
   wherein the determination step (a) determines that the operation is an operation that causes zoom-in processing to be executed if the second position relative to the first position is positioned at bottom-right, and (b) determines that the operation is an operation that causes zoom-out processing to be executed if the second position relative to the first position is positioned at top-left,
   wherein, if the determination step determines that the operation is an operation that causes zoom-in processing to be executed, the display control step causes the display unit to display, on the captured image, first information indicating zoom-in processing and a box defined by the first and second positions according to the operation, while the operation is being performed,
   wherein, if the determination step determines the operation is an operation that causes zoom-out processing to be executed, the display control step causes the display unit to display, on the captured image, second information indicating zoom-out processing and a box defined by the first and second positions according to the operation, while the operation is being performed, and
   wherein the second information is different from the first information.

16. A non-transitory computer-readable storage medium storing a computer program which, when read and executed by a computer, causes the computer to execute steps comprising:
   a display control step of causing a display unit to display a captured image captured by an image capturing apparatus; and
   a determination step of executing determination processing for determining, based on a positional relation between a first position and a second position designated by an operation with respect to the captured image displayed in the display step, whether the operation is an operation that causes zoom-in processing to be executed or an operation that causes zoom-out processing to be executed,
   wherein the determination step (a) determines that the operation is an operation that causes zoom-in processing to be executed if the second position relative to the first position is positioned at bottom-right, and (b) determines that the operation is an operation that causes zoom-out processing to be executed if the second position relative to the first position is positioned at top-left,
   wherein, if the determination step determines that the operation is an operation that causes zoom-in processing to be executed, the display control step causes the display unit to display, on the captured image, first information indicating zoom-in processing and a box defined by the first and second positions according to the operation, while the operation is being performed,
   wherein, if the determination unit determines the operation is an operation that causes zoom-out processing to be executed, the display control step causes the display unit to display, on the captured image, second information indicating zoom-out processing and a box defined by the first and second positions according to the operation, while the operation is being performed, and
   wherein the second information is different from the first information.

* * * * *